US010476087B2

(12) United States Patent
Morikawa

(10) Patent No.: US 10,476,087 B2
(45) Date of Patent: Nov. 12, 2019

(54) FUEL-CELL POWER GENERATION UNIT AND FUEL-CELL STACK

(71) Applicant: NGK SPARK PLUG CO., LTD., Nagoya-shi, Aichi (JP)

(72) Inventor: Tetsuya Morikawa, Konan (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 206 days.

(21) Appl. No.: 15/570,887

(22) PCT Filed: Apr. 27, 2016

(86) PCT No.: PCT/JP2016/063157
§ 371 (c)(1),
(2) Date: Oct. 31, 2017

(87) PCT Pub. No.: WO2016/178394
PCT Pub. Date: Nov. 10, 2016

(65) Prior Publication Data
US 2018/0294489 A1  Oct. 11, 2018

(30) Foreign Application Priority Data
May 1, 2015 (JP) .................................. 2015-093872

(51) Int. Cl.
*H01M 8/0286* (2016.01)
*H01M 8/1007* (2016.01)
(Continued)

(52) U.S. Cl.
CPC ....... *H01M 8/0286* (2013.01); *H01M 8/0247* (2013.01); *H01M 8/0273* (2013.01);
(Continued)

(58) Field of Classification Search
None
See application file for complete search history.

(56) References Cited

U.S. PATENT DOCUMENTS

| | | | |
|---|---|---|---|
| 2009/0004532 A1* | 1/2009 | Haltiner, Jr. | H01M 8/124 429/457 |
| 2010/0209800 A1 | 8/2010 | Yamanis et al. | |
| 2015/0318563 A1* | 11/2015 | Kuribayashi | H01M 8/0206 429/482 |

FOREIGN PATENT DOCUMENTS

| | | |
|---|---|---|
| JP | 2006-107868 A | 4/2006 |
| JP | 2012-230875 A | 11/2012 |

OTHER PUBLICATIONS

International Search Report dated Jul. 19, 2016, issued by the International Searching Authority in counterpart International Patent Application No. PCT/JP2016/063157 (PCT/ISA/210) (with translation).

(Continued)

*Primary Examiner* — Lucas J. O'Donnell
(74) *Attorney, Agent, or Firm* — Sughrue Mion, PLLC

(57) ABSTRACT

A fuel cell electricity generation unit including a single cell; first and second interconnectors; a separator; a metal frame member disposed between the separator and the first interconnector; and a gas sealing member having a contact portion in contact with the surfaces of the separator and the second interconnector. The unit has a contact overlap region overlapping with the contact portion in a first direction, and each of the gas sealing member, the separator, the frame member, the first interconnector, and the second interconnector is present in the contact overlap region. At least one of a first weld portion sealing between the separator and the frame member and a second weld portion sealing between the frame member and the first interconnector is formed at a position whose distance from the periphery of the single cell is greater than the distance between the periphery and the contact overlap region.

7 Claims, 22 Drawing Sheets

(51) Int. Cl.
    *H01M 8/0247* (2016.01)
    *H01M 8/0273* (2016.01)
    *H01M 8/242* (2016.01)
    H01M 8/0206 (2016.01)
    H01M 8/124 (2016.01)

(52) U.S. Cl.
    CPC ......... *H01M 8/1007* (2016.02); *H01M 8/242* (2013.01); *H01M 8/0206* (2013.01); *H01M 2008/1293* (2013.01)

(56) References Cited

OTHER PUBLICATIONS

Extended European Search Report dated Nov. 6, 2018 issued by the European Patent Office in Counterpart European Application No. 16789530.9.

* cited by examiner

US 10,476,087 B2

FUEL-CELL POWER GENERATION UNIT AND FUEL-CELL STACK

CROSS REFERENCE TO RELATED APPLICATIONS

This application is a National Stage of International Application No. PCT/JP2016/063157 filed Apr. 27, 2016, claiming priority based on Japanese Patent Application No. 2015-093872 filed May 1, 2015, the contents of all of which are incorporated herein by reference in their entirety.

TECHNICAL FIELD

A technique disclosed in the present specification relates to a fuel cell electricity generation unit and a fuel cell stack.

BACKGROUND ART

A known type of a fuel cell is a solid oxide fuel cell (hereinafter may be referred to as "SOFC"). A fuel cell electricity generation unit (hereinafter may be referred to simply as an "electricity generation unit"), which is the smallest unit of electricity generation of an SOFC, includes a single cell, a metal separator, first and second interconnectors, a metal frame member, and a gas sealing member. The single cell includes an electrolyte layer, a cathode, and an anode such that the cathode and the anode face each other in a predetermined direction (hereinafter referred to as "first direction") and the electrolyte layer intervenes between these electrodes. The separator is a frame member having a through hole, and a portion of the separator surrounding the through hole is bonded to a peripheral portion of the single cell. The separator having this structure separates a cathode chamber facing a cathode from an anode chamber facing an anode. The first and second interconnectors are members having a flat-plate shape and are disposed so as to face each other in the first direction with the single cell intervening therebetween. The frame member is disposed between the separator and the first interconnector and has a through hole forming the anode chamber. The gas sealing member is disposed between the separator and the second interconnector and has a contact portion which is in contact with both the surface of the separator on the side toward the second interconnector and the surface of the second interconnector on the side toward the separator, thereby sealing the cathode chamber.

In some cases, the electricity generation unit may include a weld portion which is formed by, for example, laser welding and seals between the separator and the frame member. In such a structure, the surface flatness of the separator may fail to be maintained due to the presence of a protrusion (e.g., bead) formed on the weld portion, and the gas sealing member may be prevented from being in good contact with the surface of the separator, resulting in impairment of gas sealing of the cathode chamber by the gas sealing member. In a conventionally known technique, the frame member has a stepped structure including a thin plate portion and a thick plate portion disposed outside of the thin plate portion (i.e., on the side more remote from a peripheral portion of a single cell) in a second direction perpendicular to a first direction, and a separator is welded to the thin plate portion of the frame member, to thereby secure a space that accommodates a protrusion of a weld portion and to prevent impairment of gas sealing of the cathode chamber by the gas sealing member due to the presence of the protrusion (see, for example, Patent Document 1).

PRIOR ART DOCUMENT

Patent Document

Patent Document 1: Japanese Patent Application Laid-Open (kokai) No. 2012-230875

SUMMARY OF THE INVENTION

Problem to be Solved by the Invention

According to the aforementioned conventional technique, a portion of the gas sealing member that is in contact with the thick plate portion of the frame member plays a role in sealing the cathode chamber, and the contact portion is located outside of the weld portion, which is located on the thin plate portion of the frame member. Thus, the space that is located inside the contact portion and accommodates the protrusion of the weld portion communicates with the cathode chamber, and the space serves as a bypass of an oxidizer gas. In such a case, a portion of the oxidizer gas may be discharged from the cathode chamber without contributing to generation of electricity, leading to a reduction in electricity generation efficiency.

Such a problem is common with a configuration wherein the frame member has a through hole forming the cathode chamber, and the contact portion of the gas sealing member seals an anode chamber. Such a problem is also common with a configuration wherein a weld portion is formed so as to seal between the separator and the frame member, and a configuration wherein a weld portion is formed so as to seal between the frame member and a first interconnector. Such a problem is also common with fuel cells other than SOFC.

The present specification discloses a technique capable of solving the aforementioned problems.

Means for Solving the Problem

A technique disclosed in the present specification can be implemented in the following modes.

(1) A fuel cell electricity generation unit disclosed in the present specification comprises a single cell including an electrolyte layer, and a cathode and an anode which face each other in a first direction with the electrolyte layer intervening therebetween; first and second metal interconnectors which face each other in the first direction with the single cell intervening therebetween; a metal separator having a through hole and a portion which surrounds the through hole and is bonded to a peripheral portion of the single cell, thereby separating a cathode chamber facing the cathode from an anode chamber facing the anode; a metal frame member disposed between the separator and the first interconnector and having a through hole forming a first chamber, which is one of the anode chamber and the cathode chamber; and a gas sealing member disposed between the separator and the second interconnector and having a contact portion which is in contact with both the surface of the separator on the side toward the second interconnector and the surface of the second interconnector on the side toward the separator, thereby sealing a second chamber, which is the other of the anode chamber and the cathode chamber, the fuel cell electricity generation unit being characterized in that the fuel cell electricity generation unit has a contact overlap region overlapping with the contact portion in the first direction; each of the gas sealing member, the separator, the frame member, the first interconnector, and the second interconnector is present in the contact overlap region; and at least one of a first weld portion sealing between the separator and the frame member and a second weld portion sealing between the frame member and the first interconnector is formed at a position whose distance from the periphery of the single cell in a second direction perpendicular to the first direction is greater than the distance between the periphery and the contact overlap region corresponding to the contact portion nearest to the single cell. According to the present fuel cell electricity generation unit, at least one of the first weld portion and the second weld portion is formed at a position whose distance from the periphery of the single cell in the second direction perpendicular to the first direction is greater than the distance between the periphery and the contact overlap region overlapping with the contact portion of the gas sealing member in the first direction. Thus, the contact portion of the gas sealing member can effectively seal the second chamber without being affected by a protrusion formed on the weld portion. Furthermore, according to the present fuel cell electricity generation unit, the contact portion prevents communication between a space overlapping with the weld portion in the second direction and the second chamber. Thus, the space does not serve as a gas bypass, and a reduction in electricity generation efficiency can be prevented.

(2) The fuel cell electricity generation unit may be configured such that the fuel cell electricity generation unit has a weld overlap region overlapping with at least one of the first weld portion and the second weld portion in the first direction, and the weld overlap region has a space formed such that the space overlaps with the gas sealing member in the second direction. According to the present fuel cell electricity generation unit, the aforementioned effect is obtained only by adjustment of the shape of the gas sealing member. Thus, a simple and efficient production process can be achieved as compared with the case where, for example, grooves are formed in a metal member (e.g., an interconnector).

(3) The fuel cell electricity generation unit may be configured such that the fuel cell electricity generation unit has a weld overlap region overlapping with at least one of the first weld portion and the second weld portion in the first direction, and the weld overlap region has a space formed such that the space overlaps with at least one of the first interconnector and the second interconnector in the second direction. According to the present fuel cell electricity generation unit, no limitation is imposed on the shape of the gas sealing member for the purpose of securing a space in the weld overlap region. Thus, the contour of the gas sealing member can be readily aligned with that of the separator or the frame member, thereby improving assembly accuracy.

(4) The fuel cell electricity generation unit may be configured such that the gas sealing member has a second contact portion at a position whose distance from the periphery of the single cell in the second direction is greater than the distance between the periphery and the first weld portion, and between the periphery and the second weld portion, the second contact portion being in contact with both the surface of the separator on the side toward the second interconnector and the surface of the second interconnector on the side toward the separator, thereby sealing between the separator and the second interconnector. According to the present fuel cell electricity generation unit, the space formed in the weld overlap region is closed by means of the second contact portion. Thus, a sealing material (e.g., glass sealing material) can be readily disposed in the space, thereby further improving the gas sealing property.

(5) The fuel cell electricity generation unit may be configured such that the gas sealing member overlaps with a space between the frame member and the single cell in the first direction. According to the present fuel cell electricity generation unit, the gas sealing member extends further inwardly in the second direction. This configuration can reduce the volume of a space through which a gas not contributing to electricity generation flows in the second chamber, thereby further effectively preventing a reduction in electricity generation efficiency.

(6) A fuel cell stack disclosed in the present specification comprises a plurality of fuel cell electricity generation units arranged in a first direction; and first and second metal end plates which face each other in the first direction with the fuel cell electricity generation units intervening therebetween, wherein each fuel cell electricity generation unit comprises a single cell including an electrolyte layer, and a cathode and an anode which face each other in the first direction with the electrolyte layer intervening therebetween; first and second metal interconnectors which face the single cell in the first direction; a metal separator having a through hole and a portion which surrounds the through hole and is bonded to a peripheral portion of the single cell, thereby separating a cathode chamber facing the cathode from an anode chamber facing the anode; a metal frame member disposed between the separator and the first interconnector facing one surface of the separator, the metal frame member having a through hole forming a first chamber, which is one of the anode chamber and the cathode chamber; and a gas sealing member disposed between the separator and the second interconnector facing the surface of the separator opposite the surface facing the frame member, the gas sealing member having a contact portion which is in contact with both the surface of the separator on the side toward the second interconnector and the surface of the second interconnector on the side toward the separator, thereby sealing a second chamber, which is the other of the anode chamber and the cathode chamber, and wherein each fuel cell electricity generation unit has a contact overlap region overlapping with the contact portion in the first direction, the contact overlap region being a portion of the fuel cell stack; each of the gas sealing member, the separator, the frame member, the first interconnector, and the second interconnector of the fuel cell electricity generation unit and the first and second end plates is present in the contact overlap region; and at least one of a first weld portion sealing between the separator and the frame member and a second weld portion sealing between the frame member and the first interconnector is formed at a position whose distance from the periphery of the single cell in a second direction perpendicular to the first direction is greater than the distance between the periphery and the contact overlap region corresponding to the contact portion nearest to the single cell. According to the present fuel cell stack, at least one of the first weld portion and the second weld portion is formed at a position whose distance from the periphery of the single cell in the second direction perpendicular to the first direction is greater than the distance between the periphery and the contact overlap region overlapping with the contact portion of the gas sealing member in the first direction. Thus, the contact portion of the gas sealing member can effectively seal the second chamber without being affected by a protrusion formed on the weld portion. Furthermore, according to the present fuel cell stack, the contact portion prevents communication between a space overlapping with the weld portion in the second direction and the second chamber. Thus, the space does not serve as a gas bypass, and a reduction in electricity generation efficiency can be prevented.

The technique disclosed in the present specification can be implemented in various modes; for example, a fuel cell electricity generation unit, a fuel cell stack including a plurality of fuel cell electricity generation units, an electricity generation module including the fuel cell stack, and a fuel cell system including the electricity generation module.

MODES FOR CARRYING OUT THE INVENTION

Figure 1:
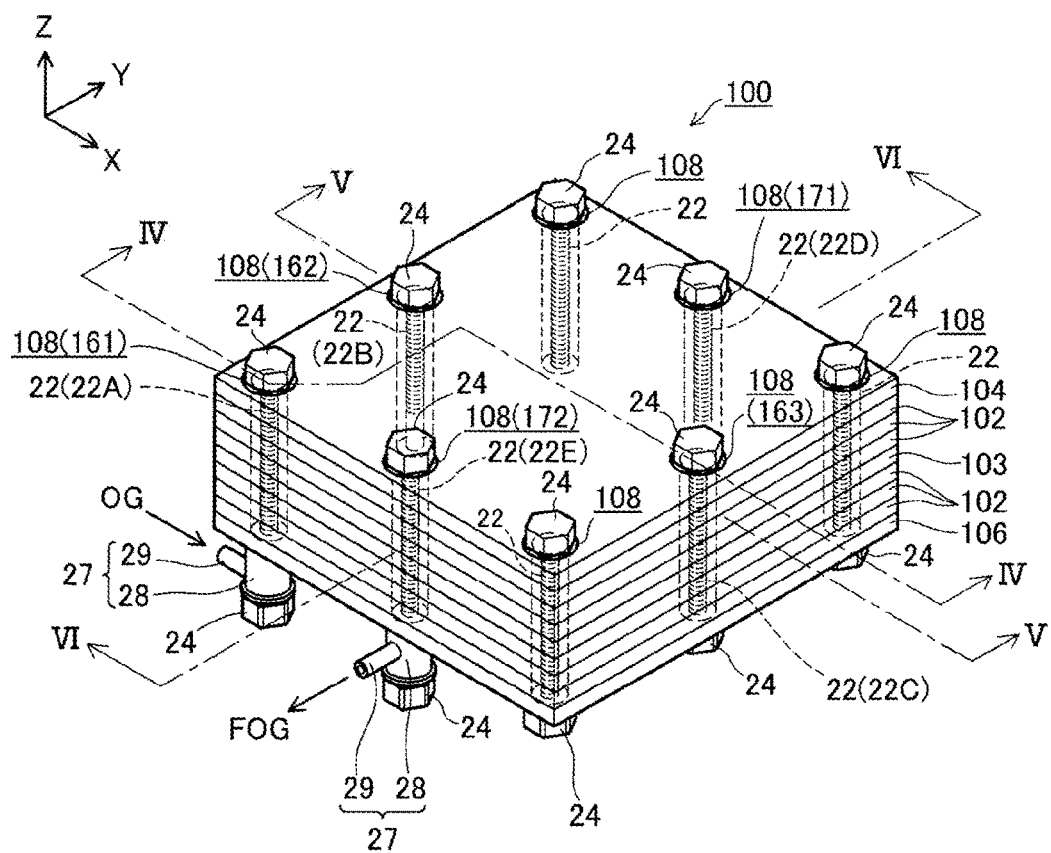
FIG. 1 Perspective view showing the external appearance of a fuel cell stack 100 according to a first embodiment.
Figure 2:
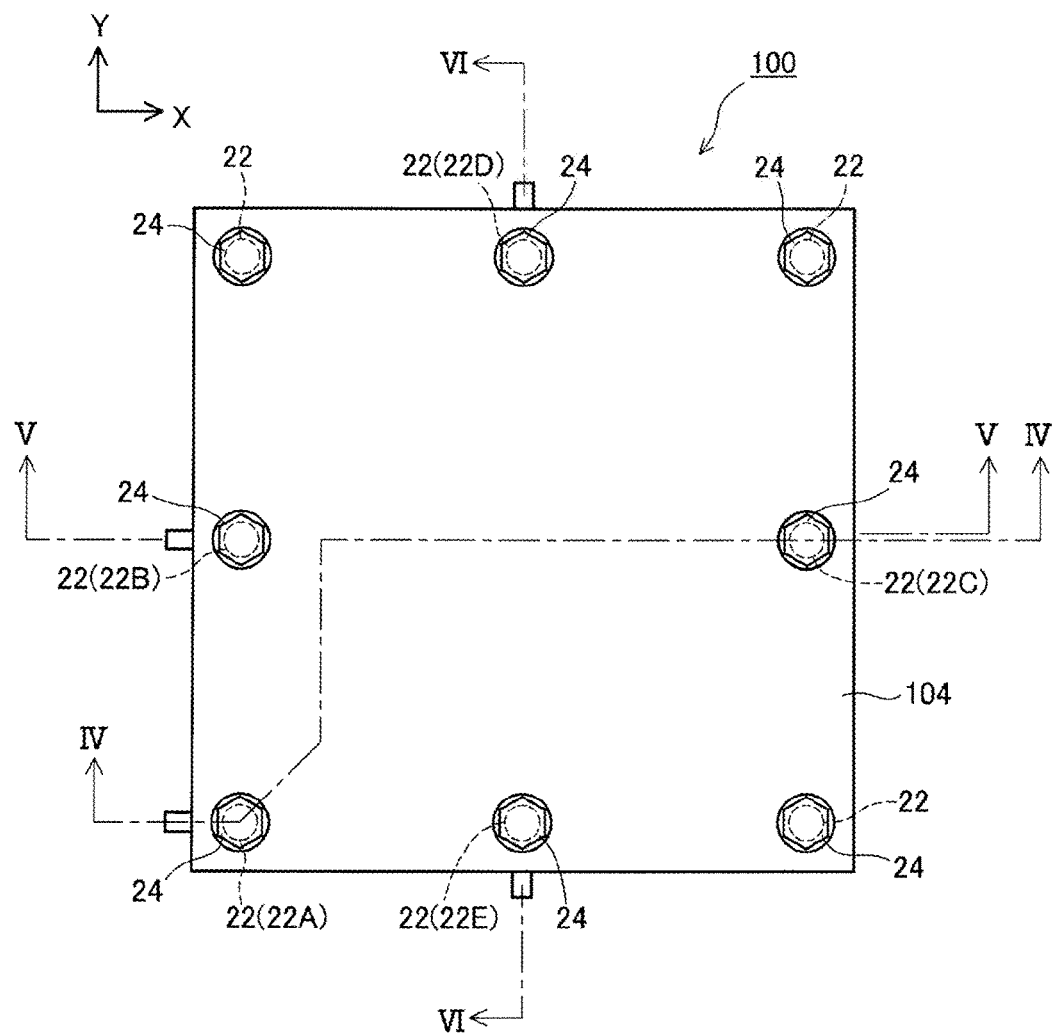
FIG. 2 Explanatory view showing a top XY plane of the fuel cell stack 100 according to the first embodiment.
Figure 3:
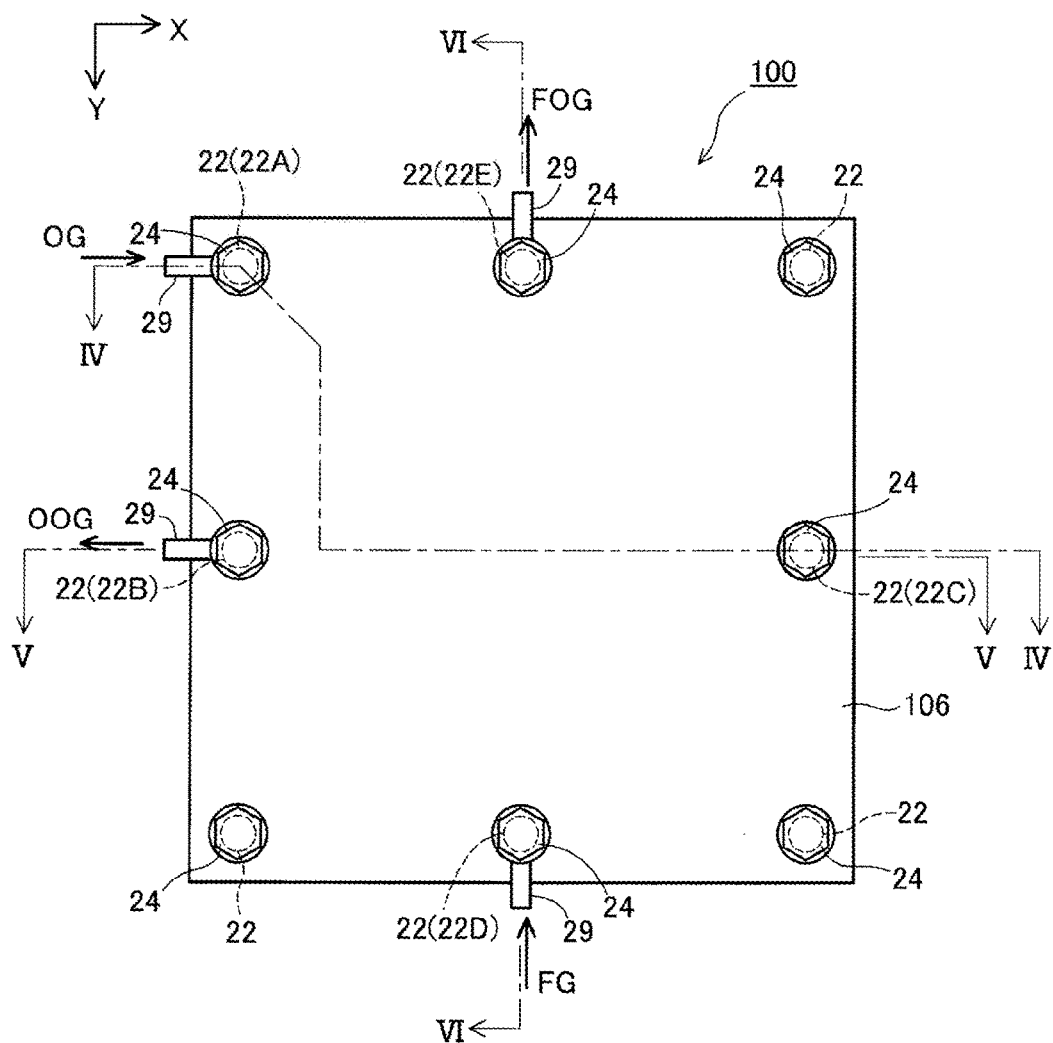
FIG. 3 Explanatory view showing a bottom XY plane of the fuel cell stack 100 according to the first embodiment.
Figure 4:
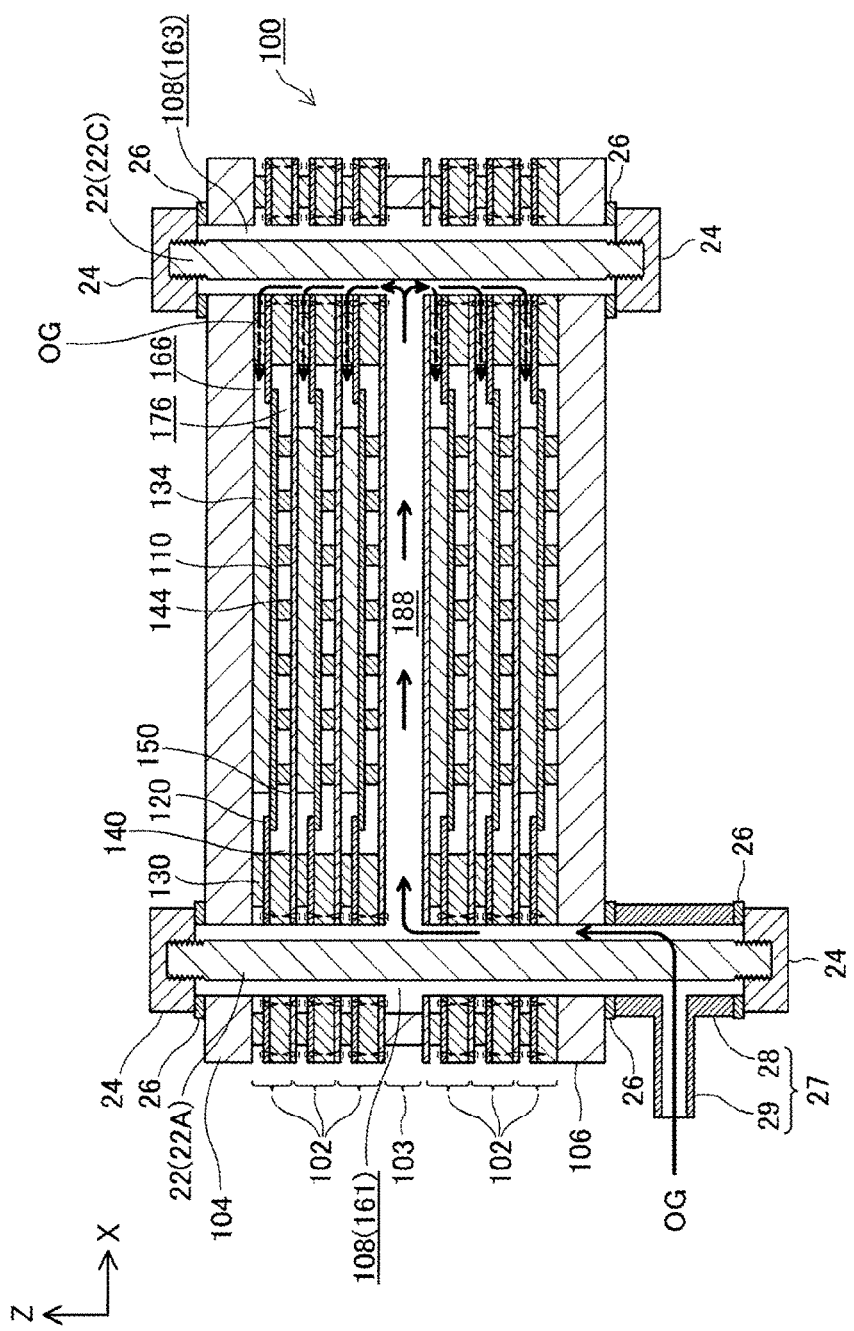
FIG. 4 Explanatory view showing an XZ section of the fuel cell stack 100 taken along line IV-IV of FIGS. 1 to 3.
Figure 5:
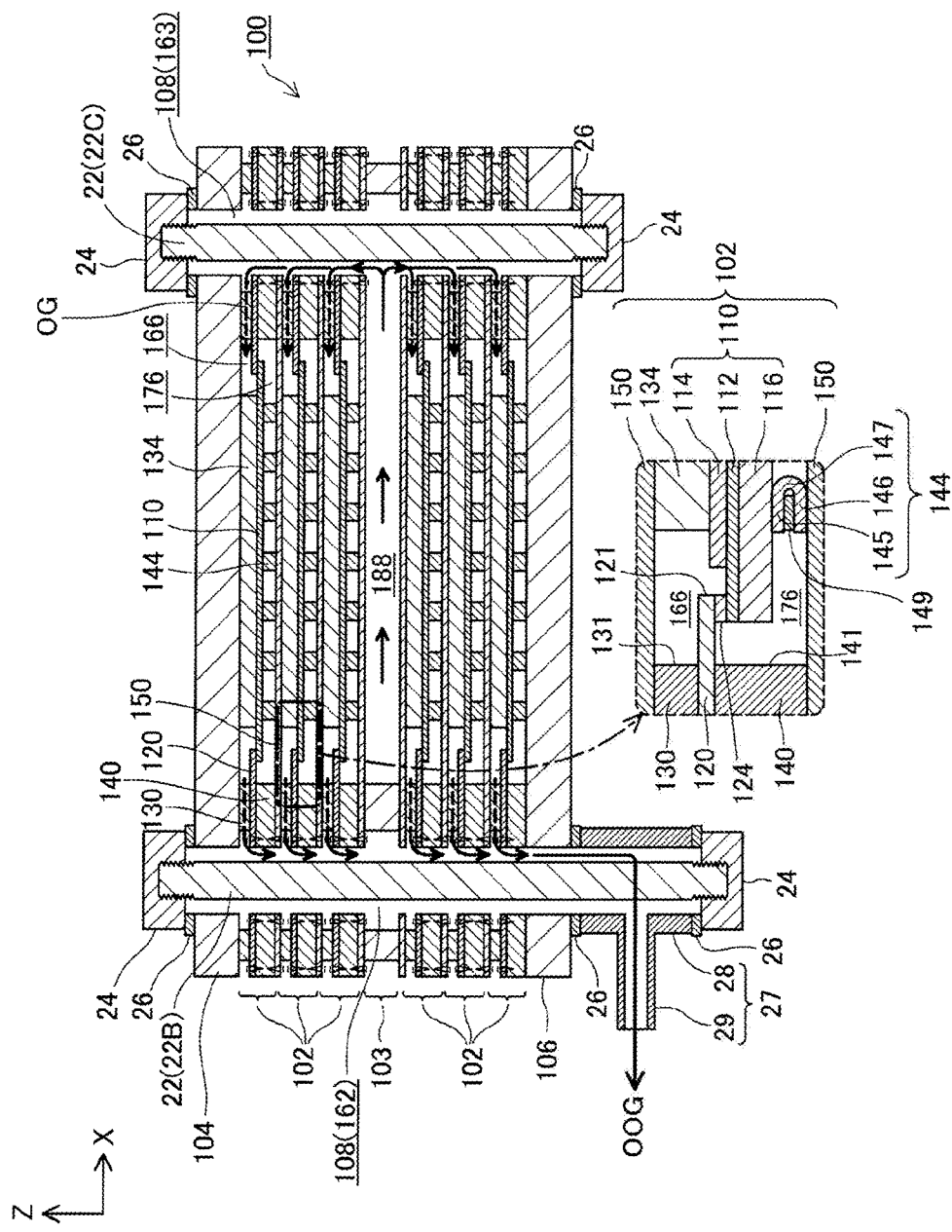
FIG. 5 Explanatory view showing a YZ section of the fuel cell stack 100 taken along line V-V of FIGS. 1 to 3.
Figure 6:
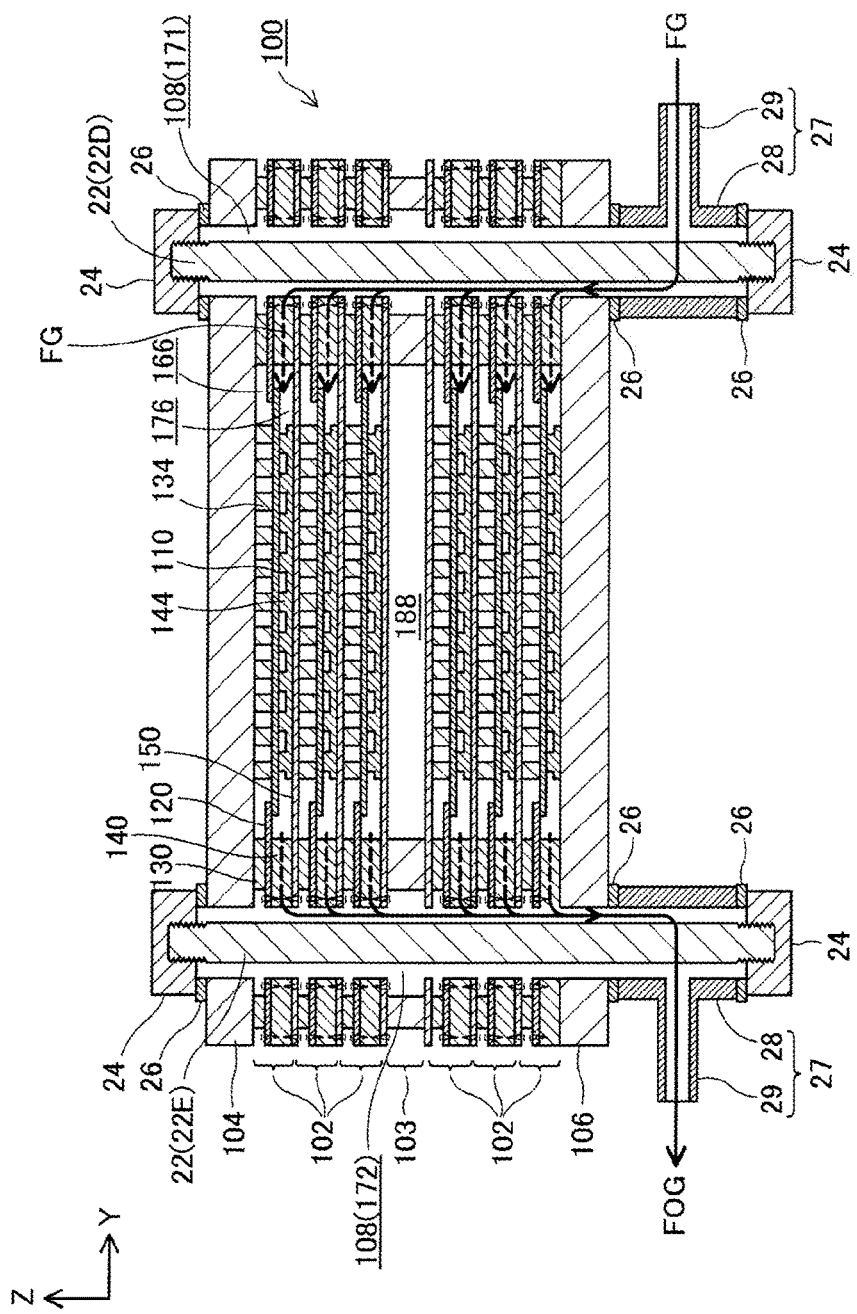
FIG. 6 Explanatory view of the same XZ section as that of FIG. 4, showing two adjacent electricity generation units 102.

A. First Embodiment:
A-1. Structure of fuel cell stack 100:

FIGS. 1 to 6 are explanatory views schematically illustrating the structure of a fuel cell stack 100 according to a first embodiment. FIG. 1 illustrates the external appearance of the fuel cell stack 100; FIG. 2 is a top plan view of the fuel cell stack 100; FIG. 3 is a bottom plan view of the fuel cell stack 100; FIG. 4 is a sectional view of the fuel cell stack 100 taken along line IV-IV of FIGS. 1 to 3; FIG. 5 is a sectional view of the fuel cell stack 100 taken along line V-V of FIGS. 1 to 3; and FIG. 6 is a sectional view of the fuel cell stack 100 taken along line VI-VI of FIGS. 1 to 3. FIGS. 1 to 6 show mutually orthogonal X-axis, Y-axis, and Z-axis for specifying orientation. In the present specification, for the sake of convenience, the positive Z-axis direction is called the upward direction, and the negative Z-axis direction is called the downward direction; however, in actuality, the fuel cell stack 100 may be disposed in a different orientation. The same also applies to FIG. 7 and subsequent drawings.

The fuel cell stack 100 includes a plurality of (six in the first embodiment) of electricity generation units 102, a heat exchange member 103, and a pair of end plates 104 and 106. The six electricity generation units 102 are disposed in a predetermined direction of array (in the vertical direction in the first embodiment). Three electricity generation units 102 (first group) of the six electricity generation units 102 are juxtaposed to one another, and the remaining three electricity generation units 102 (second group) are also juxtaposed to one another. The heat exchange member 103 is disposed between the first group of three electricity generation units 102 and the second group of three electricity generation units 102. That is, the heat exchange member 103 is disposed around the center (in the vertical direction) of an assembly of the six electricity generation units 102 and the heat exchange member 103. The paired end plates 104 and 106 are disposed in such a manner as to sandwich the assembly of the six electricity generation units 102 and the heat exchange member 103 in the vertical direction.

The fuel cell stack 100 has a plurality (eight in the first embodiment) of holes formed therein and extending in the vertical direction through peripheral portions about the Z-axis direction of its component layers (the electricity generation units 102, the heat exchange member 103, and the end plates 104 and 106), and the corresponding holes formed in the layers communicated with one another in the vertical direction, thereby forming communication holes 108 extending in the vertical direction from one end plate 104 to the other end plate 106.

Bolts 22 extending in the vertical direction are inserted into the corresponding communication holes 108, and the fuel cell stack 100 is clamped by means of the bolts 22 and nuts 24 engaged with opposite ends of the bolts 22. As shown in FIGS. 4 to 6, corresponding insulation sheets 26 intervene between the nuts 24 engaged with one ends (upper ends) of the bolts 22 and the upper surface of the end plate 104 serving as the upper end of the fuel cell stack 100 and between the nuts 24 engaged with the other ends (lower ends) of the bolts 22 and the lower surface of the end plate 106 serving as the lower end of the fuel cell stack 100. However, in each region where a gas passage member 27, which will be described later, is provided, the gas passage member 27 and the insulation sheets 26 disposed respectively on the upper end and on the lower end of the gas passage member 27 intervene between the nut 24 and the surface of the end plate 106. The insulation sheet 26 is formed of, for example, a mica sheet, a ceramic fiber sheet, a ceramic compact sheet, a glass sheet, or a glass ceramic composite material.

The outside diameter of a shaft portion of each bolt 22 is smaller than the inside diameter of each communication hole 108. Accordingly, a space is secured between the outer circumferential surface of the shaft portion of each bolt 22 and the inner circumferential surface of each communication hole 108. As shown in FIGS. 2 to 4, a space defined by the bolt 22 (bolt 22A) located around one vertex of the perimeter about the Z-axis direction of the fuel cell stack 100 (a vertex on the negative side in the Y-axis direction and on the negative side in the X-axis direction) and the communication hole 108 into which the bolt 22A is inserted functions as an oxidizer gas introduction manifold 161 (gas flow channel) into which oxidizer gas OG is introduced from outside the fuel cell stack 100, whereas a space defined by the bolt 22 (bolt 22C) located around the midpoint of one side of the perimeter about the Z-axis direction of the fuel cell stack 100 (a side on the positive side in the X-axis direction of two sides parallel to the Y-axis) and the communication hole 108 into which the bolt 22C is inserted functions as an oxidizer gas supply manifold 163 (gas flow channel) for supplying the oxidizer gas OG discharged from the heat exchange member 103 to the electricity generation units 102. As shown in FIGS. 2, 3, and 5, a space defined by the bolt 22 (bolt 22B) located around the midpoint of one side of the perimeter about the Z-axis direction of the fuel cell stack 100 (a side on the negative side in the X-axis direction of two sides parallel to the Y-axis) and the communication hole 108 into which the bolt 22B is inserted functions as an oxidizer gas discharge manifold 162 from which oxidizer offgas OOG (i.e., unreacted oxidizer gas OG) discharged from the electricity generation units 102 is discharged to the outside of the fuel cell stack 100. In the first embodiment, for example, air is used as the oxidizer gas OG.

As shown in FIGS. 2, 3, and 6, a space defined by the bolt 22 (bolt 22D) located around the midpoint of one side of the perimeter about the Z-axis direction of the fuel cell stack 100 (a side on the positive side in the Y-axis direction of two sides parallel to the X-axis) and the communication hole 108 into which the bolt 22D is inserted functions as an fuel gas introduction manifold 171 into which fuel gas FG is introduced from outside the fuel cell stack 100 and which supplies the fuel gas FG to the electricity generation units 102, whereas a space defined by the bolt 22 (bolt 22E) located around the midpoint of the other side opposite the above side (a side on the negative side in the Y-axis direction of two sides parallel to the X-axis) and the communication hole 108 into which the bolt 22E is inserted functions as a fuel gas discharge manifold 172 from which fuel offgas FOG (containing unreacted fuel gas FG and fuel gas FG after electricity generation) is discharged to the outside of the fuel cell stack 100. In the first embodiment, for example, hydrogen-rich gas reformed from city gas is used as the fuel gas FG.

As shown in FIGS. 4 to 6, the fuel cell stack 100 has four gas passage members 27. Each gas passage member 27 has a tubular body portion 28 and a tubular branch portion 29 branching from the side surface of the body portion 28. The hole of the branch portion 29 communicates with the hole of the body portion 28. A gas pipe (not shown) is connected to the branch portion 29 of each gas passage member 27. As shown in FIG. 4, the hole of the body portion 28 of the gas passage member 27 disposed at the position of the bolt 22A which partially defines the oxidizer gas introduction manifold 161 communicates with the oxidizer gas introduction manifold 161. As shown in FIG. 5, the hole of the body portion 28 of the gas passage member 27 disposed at the position of the bolt 22B which partially defines the oxidizer gas discharge manifold 162 communicates with the oxidizer gas discharge manifold 162. As shown in FIG. 6, the hole of the body portion 28 of the gas passage member 27 disposed at the position of the bolt 22D which partially defines the fuel gas introduction manifold 171 communicates with the fuel gas introduction manifold 171, whereas the hole of the body portion 28 of the gas passage member 27 disposed at the position of the bolt 22E which partially defines the fuel gas discharge manifold 172 communicates with the fuel gas discharge manifold 172.

(Structure of end plates 104 and 106)

The two end plates 104 and 106 are electrically conductive members each having a rectangular flat-plate shape and are formed of, for example, stainless steel. One end plate 104 is disposed on the uppermost electricity generation unit 102, and the other end plate 106 is disposed under the lowermost electricity generation unit 102. A plurality of the electricity generation units 102 and the heat exchange member 103 are held under pressure between the two end plates 104 and 106. The upper end plate 104 functions as a positive output terminal of the fuel cell stack 100, and the lower end plate 106 functions as a negative output terminal of the fuel cell stack 100.

(Structure of electricity generation unit 102)

As shown in FIGS. 4 to 6, the electricity generation unit 102 serving as the smallest unit of electricity generation includes a single cell 110, a separator 120, cathode-side frame 130, a cathode-side current collector 134, an anode-side frame 140, an anode-side current collector 144, and a pair of interconnectors 150 serving as the uppermost layer and the lowermost layer of the electricity generation unit 102.

FIGS. 7 to 10 are explanatory views schematically illustrating the structure of the electricity generation unit 102 according to the first embodiment. FIGS. 7 to 10 are sectional views (in the direction perpendicular to the Z-direction) of the electricity generation unit 102 at the positions of the cathode-side frame 130, the anode-side frame 140, the separator 120, and the interconnector 150, respectively. As shown in FIGS. 7 to 10, holes corresponding to the communication holes 108 into which the bolts 22 are inserted are formed in peripheral portions about the Z-axis direction of the cathode-side frame 130, the anode-side frame 140, the separator 120, and the interconnector 150.

Figure 10:
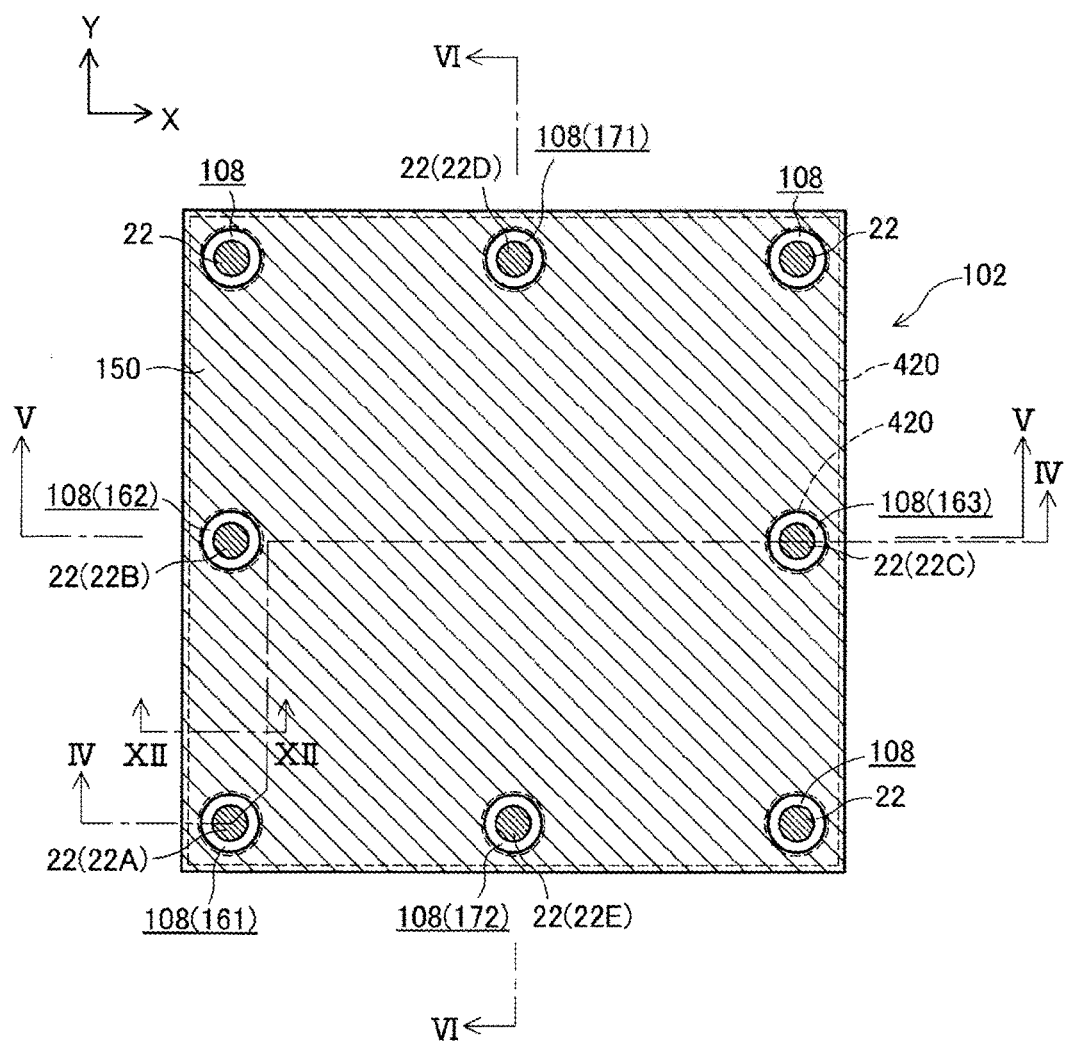
FIG. 10 Explanatory view showing an XY section of the electricity generation unit 102 at the position of an interconnector 150 according to the first embodiment.

As shown in FIG. 10, the interconnector 150 is an electrically conductive member having a rectangular flat-plate shape and is formed of, for example, ferritic stainless steel. The interconnector 150 secures electrical conductivity between the electricity generation units 102 and prevents mixing of reaction gases between the electricity generation units 102. As shown in FIGS. 4 to 6, in the present embodiment, two electricity generation units 102 are disposed adjacent to each other, and the two adjacent electricity generation units 102 share one interconnector 150. That is, the upper interconnector 150 of a certain electricity generation unit 102 serves as a lower interconnector 150 of the upper adjacent electricity generation unit 102. Also, since the fuel cell stack 100 has the two end plates 104 and 106, the uppermost electricity generation unit 102 of the fuel cell stack 100 does not have the upper interconnector 150, and the lowermost electricity generation unit 102 does not have the lower interconnector 150.

As shown in FIG. 5, the single cell 110 includes an electrolyte layer 112, and a cathode 114 and an anode 116 which face each other in the vertical direction (direction of array of the electricity generation units 102) with the electrolyte layer 112 intervening therebetween. The single cell 110 of the present embodiment is an anode-support-type single cell in which the anode 116 supports the electrolyte layer 112 and the cathode 114. The direction in which the cathode 114 and the anode 116 face each other (vertical direction) corresponds to the first direction appearing in CLAIMS.

The electrolyte layer 112 is a member having a rectangular flat-plate shape and is formed of a solid oxide; for example, YSZ (yttria-stabilized zirconia), ScSZ (scandia-stabilized zirconia), SDC (samarium-doped ceria), GDC (gadolinium-doped ceria), or a perovskite-type oxide. The cathode 114 is a member having a rectangular flat-plate shape and is formed of, for example, a perovskite-type oxide (e.g., LSCF (lanthanum strontium cobalt ferrite), LSM (lanthanum strontium manganese oxide), or LNF (lanthanum nickel ferrite)). The anode 116 is a member having a rectangular flat-plate shape and is formed of, for example, Ni (nickel), a cermet of Ni and ceramic powder, or an Ni-based alloy. Thus, the single cell 110 (electricity generation unit 102) of the present embodiment is a solid oxide fuel cell (SOFC) which uses a solid oxide as an electrolyte.

Figure 9:
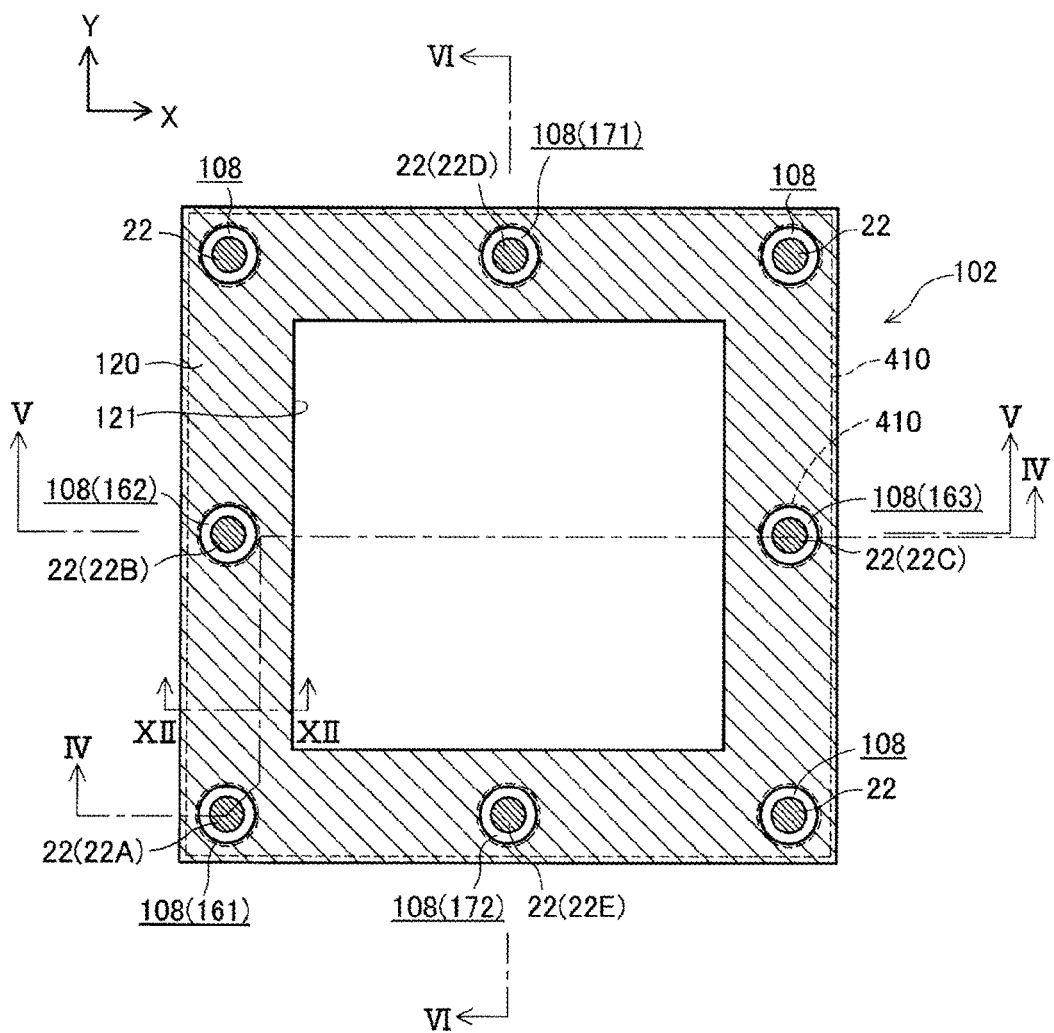
FIG. 9 Explanatory view showing an XY section of the electricity generation unit 102 at the position of a separator 120 according to the first embodiment.

As shown in FIG. 9, the separator 120 is a frame member which has a rectangular hole 121 formed in a central region thereof and extending therethrough in the vertical direction, and is formed of, for example, a metal. As shown in FIG. 5, a portion of the separator 120 around the hole 121 faces a peripheral portion of the surface on the cathode 114 side of the electrolyte layer 112. The separator 120 is bonded to the electrolyte layer 112 (single cell 110) by means of a bonding member 124 formed of a brazing material (e.g., Ag brazing material) and disposed between the facing portion and the electrolyte layer 112. The separator 120 separates the cathode chamber 166 which faces the cathode 114, and the anode chamber 176 which faces the anode 116, from each other, thereby restraining gas leakage from one electrode side to the other electrode side through a peripheral portion of the single cell 110. The single cell 110 to which the separator 120 is bonded is also called a separator-attached single cell.

Figure 7:
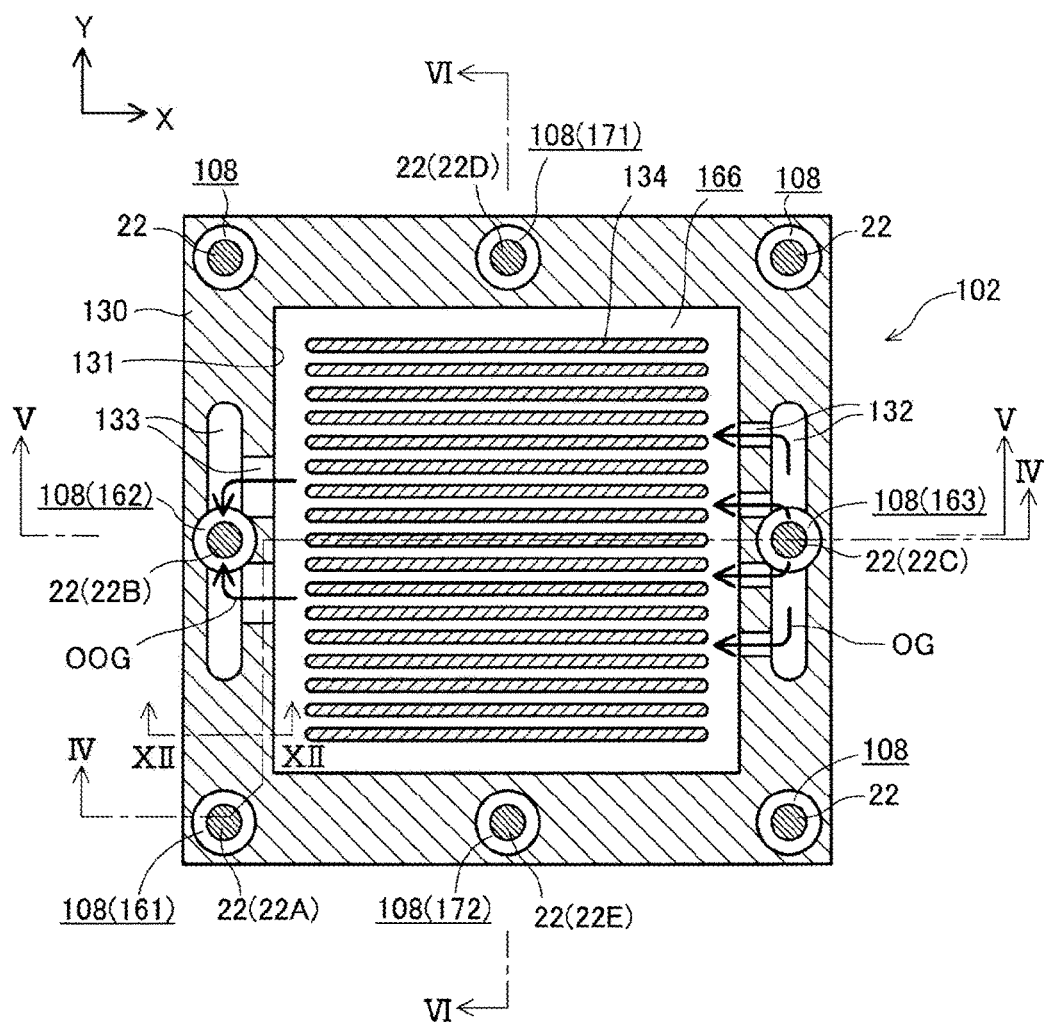
FIG. 7 Explanatory view showing an XY section of the electricity generation unit 102 at the position of a cathode-side frame 130 according to the first embodiment.

As shown in FIG. 7, the cathode-side frame 130 is a frame member which has a rectangular hole 131 formed in a central region thereof and extending therethrough in the vertical direction, and is formed of, for example, an insulator (e.g., mica, Thermiculite, or vermiculite). The hole 131 of the cathode-side frame 130 partially constitutes the cathode chamber 166 which faces the cathode 114. The cathode-side frame 130 has an oxidizer gas supply communication hole 132 formed therein and adapted to establish communication between the oxidizer gas supply manifold 163 and the cathode chamber 166, and an oxidizer gas discharge communication hole 133 formed therein and adapted to establish communication between the cathode chamber 166 and the oxidizer gas discharge manifold 162. As shown in FIGS. 4 to 6, the cathode-side frame 130 is in contact with a peripheral portion of the surface on the side opposite the electrolyte layer 112 of the separator 120 and with a peripheral portion of the surface on the side toward the cathode 114 of the interconnector 150. More specifically, the cathode-side frame 130 is in contact with the surface of the separator 120 and the surface of the interconnector 150 by means of the fastening force of the bolts 22 (i.e., the compression force in the vertical direction). The cathode-side frame 130 having the aforementioned structure seals the cathode chamber 166, and electrically insulates the paired interconnectors 150 contained in the electrically generation unit 102 from each other. The sealing by the cathode-side frame 130 is also called "compression sealing." Details of the structure of the cathode-side frame 130 will be described below.

Figure 8:
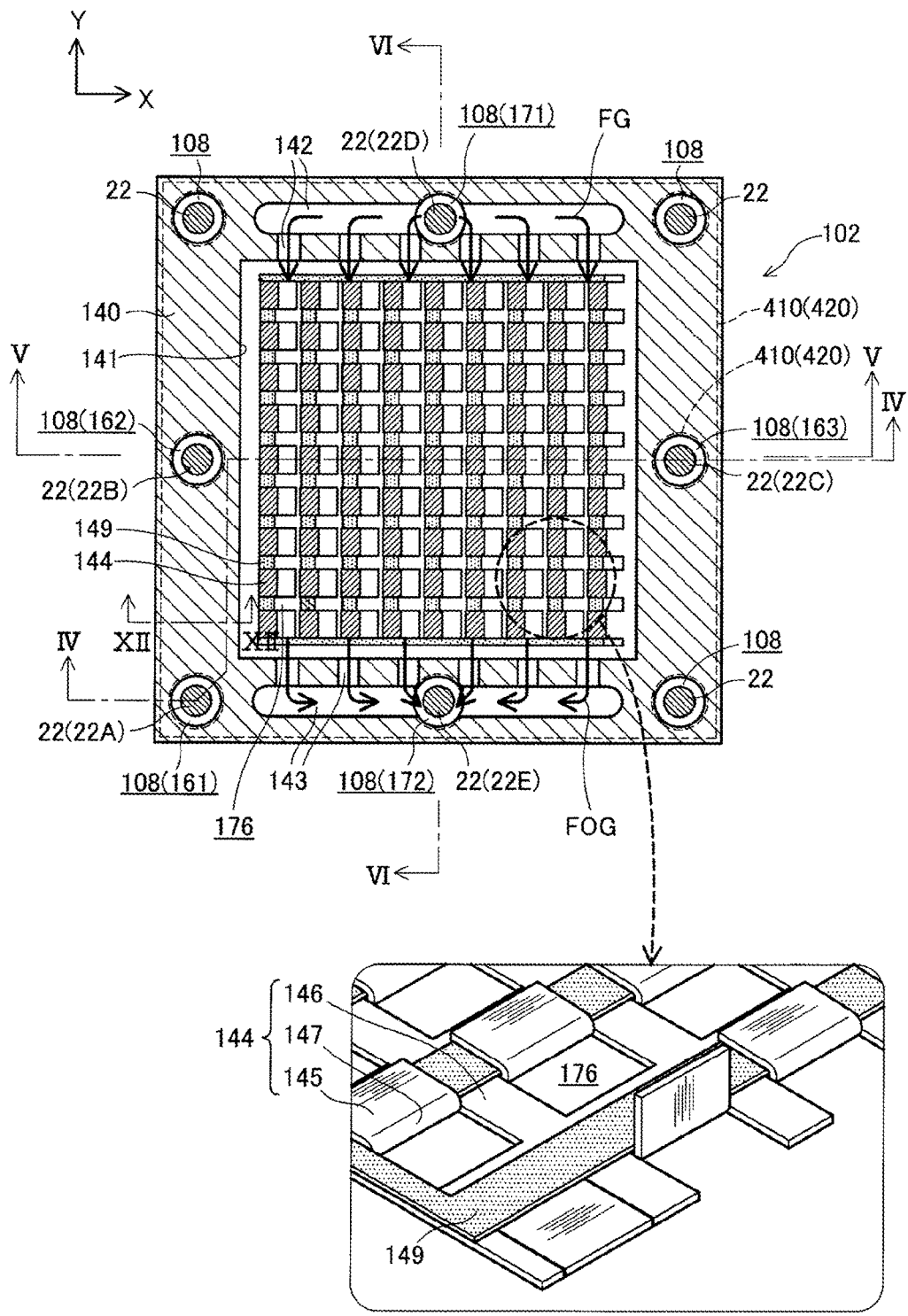
FIG. 8 Explanatory view showing an XY section of the electricity generation unit 102 at the position of an anode-side frame 140 according to the first embodiment.

As shown in FIG. 8, the anode-side frame 140 is a frame member which has a rectangular hole 141 formed in a central region thereof and extending therethrough in the vertical direction, and is formed of, for example, a metal. The hole 141 of the anode-side frame 140 partially constitutes the anode chamber 176 which faces the anode 116. The anode-side frame 140 has a fuel gas supply communication hole 142 formed therein and adapted to establish communication between the fuel gas introduction manifold 171 and the anode chamber 176, and a fuel gas discharge communication hole 143 formed therein and adapted to establish communication between the anode chamber 176 and the fuel gas discharge manifold 172.

As shown in FIGS. 4 to 6, the anode-side frame 140 is in contact with a peripheral portion of the surface on the side toward the electrolyte layer 112 of the separator 120 and with a peripheral portion of the surface on the side toward the anode 116 of the interconnector 150. Details of the structure of the anode-side frame 140 will be described below.

As shown in FIGS. 4 to 7, the cathode-side current collector 134 is disposed within the cathode chamber 166. The cathode-side current collector 134 is composed of a plurality of approximately rectangular columnar conductive members disposed at predetermined intervals, and is formed of, for example, ferritic stainless steel. The cathode-side current collector 134 is in contact with the surface on the side opposite the electrolyte layer 112 of the cathode 114 and with the surface on the side toward the cathode 114 of the interconnector 150. Thus, the cathode-side current collector 134 electrically connects the cathode 114 to the interconnector 150. The cathode-side current collector 134 and the interconnector 150 may be in the form of a unitary member.

As shown in FIGS. 4 to 6 and 8, the anode-side current collector 144 is disposed within the anode chamber 176. The anode-side current collector 144 includes an interconnector facing portion 146, a plurality of electrode facing portions 145, and a connection portion 147 which connects each electrode facing portion 145 to the interconnector facing portion 146. The anode-side current collector 144 is formed of, for example, nickel, a nickel alloy, or stainless steel. Each electrode facing portion 145 is in contact with the surface on the side opposite the electrolyte layer 112 of the anode 116, and the interconnector facing portion 146 is in contact with the surface on the side toward the anode 116 of the interconnector 150. Thus, the anode-side current collector 144 electrically connects the anode 116 to the interconnector 150. A spacer 149 formed of, for example, mica is disposed between the electrode facing portion 145 and the interconnector facing portion 146. Therefore, the anode-side current collector 144 follows the deformation of the electricity generation unit 102 stemming from a temperature cycle and a pressure variation of reaction gas, thereby maintaining good electrical connection between the anode 116 and the interconnector 150 via the anode-side current collector 144.
(Structure of heat exchange member 103)

Figure 11:
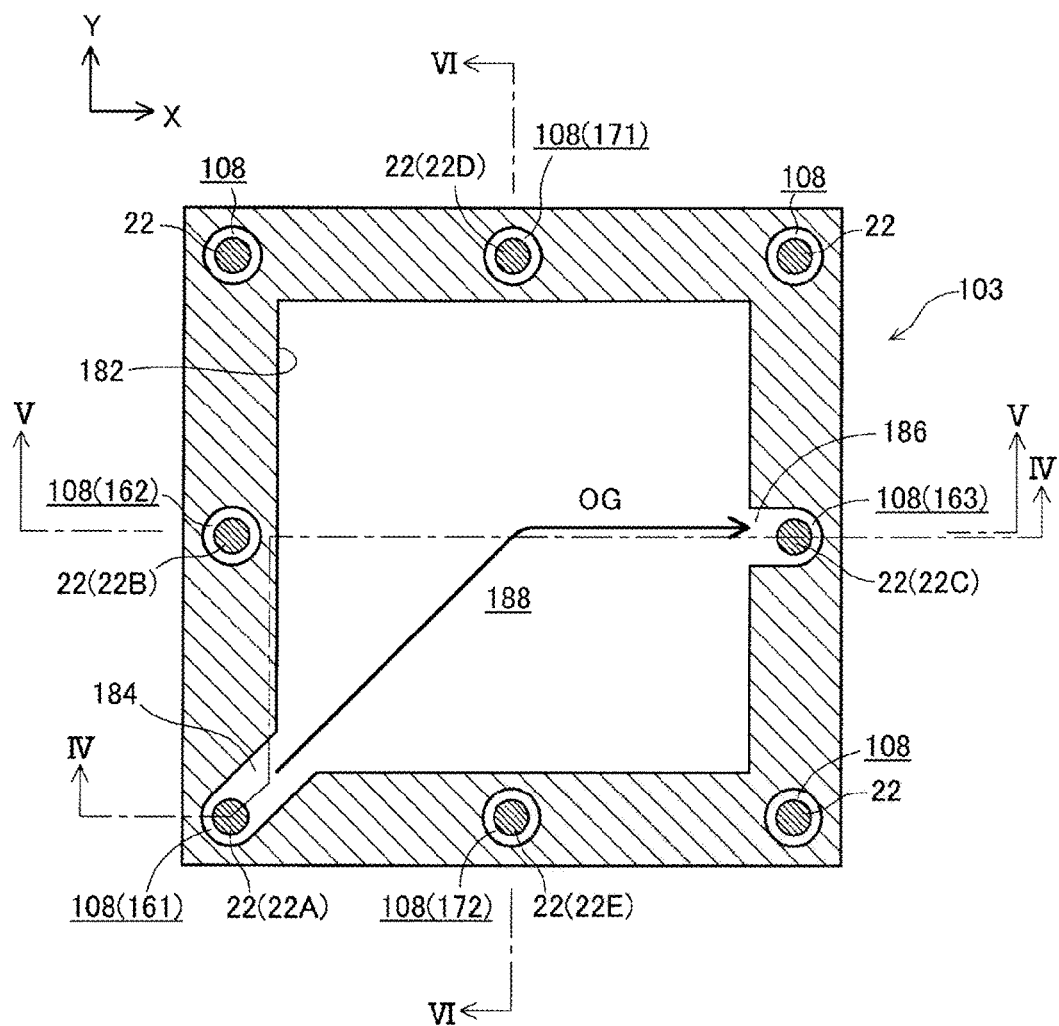
FIG. 11 Explanatory view showing an XY section of a heat exchange member 103 according to the first embodiment.

FIG. 11 is an explanatory view schematically illustrating the structure of the heat exchange member 103 according to the first embodiment. FIG. 11 illustrates a cross section of the heat exchange member 103 in the direction perpendicular to the Z-axis direction. As shown in FIGS. 4 to 6 and 11, the heat exchange member 103 is a member having a rectangular flat-plate shape and is formed of, for example, ferritic stainless steel. As described above, the heat exchange member 103 has, on its peripheral portions about the Z-axis direction, eight holes forming the communication holes 108 into which the bolts 22 are inserted. The heat exchange member 103 also has a hole 182 formed in a central region thereof and extending therethrough in the vertical direction. The heat exchange member 103 also has a communication hole 184 adapted to establish communication between the central hole 182 and the communication hole 108 forming the oxidizer gas introduction manifold 161, and a communication hole 186 adapted to establish communication between the central hole 182 and the communication hole 108 forming the oxidizer gas supply manifold 163. The heat exchange member 103 is sandwiched between the lower interconnector 150 contained in the electricity generation unit 102 upwardly adjacent to the heat exchange member 103 and the upper interconnector 150 contained in the electricity generation unit 102 downwardly adjacent to the heat exchange member 103. A space formed between these interconnectors 150 by the hole 182 and the communication holes 184 and 186 functions as a heat exchange flow channel 188 through which the oxidizer gas OG flows for heat exchange as described below.

A-2. Operation of fuel cell stack 100:

As shown in FIG. 4, when the oxidizer gas OG is supplied through a gas pipe (not shown) connected to the branch portion 29 of the gas passage member 27 provided at the position of the oxidizer gas introduction manifold 161, the oxidizer gas OG is supplied to the oxidizer gas introduction manifold 161 through the holes of the branch portion 29 and the body portion 28 of the gas passage member 27. As shown in FIGS. 4 and 11, the oxidizer gas OG supplied to the oxidizer gas introduction manifold 161 flows through the heat exchange flow channel 188 formed in the heat exchange member 103 and then is discharged to the oxidizer gas supply manifold 163. Since the oxidizer gas introduction manifold 161 does not communicate with the cathode chambers 166 of the electricity generation units 102, the oxidizer gas OG is not supplied from the oxidizer gas introduction manifold 161 to the cathode chambers 166 of the electricity generation units 102. As shown in FIGS. 4, 5, and 7, the oxidizer gas OG discharged to the oxidizer gas supply manifold 163 is supplied from the oxidizer gas supply manifold 163 to the cathode chambers 166 through the oxidizer gas supply communication holes 132 of the electricity generation units 102.

As shown in FIGS. 6 and 8, when the fuel gas FG is supplied through a gas pipe (not shown) connected to the branch portion 29 of the gas passage member 27 provided at the position of the fuel gas introduction manifold 171, the fuel gas FG is supplied to the fuel gas introduction manifold 171 through the holes of the branch portion 29 and the body portion 28 of the gas passage member 27 and is then supplied from the fuel gas introduction manifold 171 to the anode chambers 176 through the fuel gas supply communication holes 142 of the electricity generation units 102.

When the oxidizer gas OG is supplied to the cathode chamber 166 of each electricity generation unit 102, whereas the fuel gas FG is supplied to the anode chamber 176 of each electricity generation unit 102, the single cell 110 generates electricity through the electrochemical reaction between the oxidizer gas OG and the fuel gas FG. The electricity generating reaction is an exothermic reaction. In each electricity generation unit 102, the cathode 114 of the single cell 110 is electrically connected to one interconnector 150 through the cathode-side current collector 134, whereas the anode 116 is electrically connected to the other interconnector 150 through the anode-side current collector 144. Also, a plurality of the electricity generation units 102 contained in the fuel cell stack 100 are connected electrically in series via the heat exchange member 103. Accordingly, electric energy generated in the electricity generation units 102 is output from the end plates 104 and 106 which function as output terminals of the fuel cell stack 100. Notably, in the SOFC, since electricity is generated at a relatively high temperature (e.g., 700° C. to 1,000° C.), the fuel cell stack 100 may be heated by a heater (not shown) from startup till the high temperature can be maintained by means of heat generated as a result of generation of electricity.

As shown in FIGS. 5 and 7, the oxidizer offgas OOG discharged from the cathode chambers 166 of the electricity generation units 102 is discharged to the oxidizer gas discharge manifold 162 through the oxidizer gas discharge communication holes 133, passes through the holes of the body portion 28 and the branch portion 29 of the gas passage member 27 provided at the position of the oxidizer gas discharge manifold 162, and is then discharged to the outside of the fuel cell stack 100 through a gas pipe (not shown) connected to the branch portion 29. Also, as shown in FIGS. 6 and 8, the fuel offgas FOG discharged from the anode chambers 176 of the electricity generation units 102 is discharged to the fuel gas discharge manifold 172 through the fuel gas discharge communication holes 143, passes through the holes of the body portion 28 and the branch portion 29 of the gas passage member 27 provided at the position of the fuel gas discharge manifold 172, and is then discharged to the outside of the fuel cell stack 100 through a gas pipe (not shown) connected to the branch portion 29.

Figure 12:
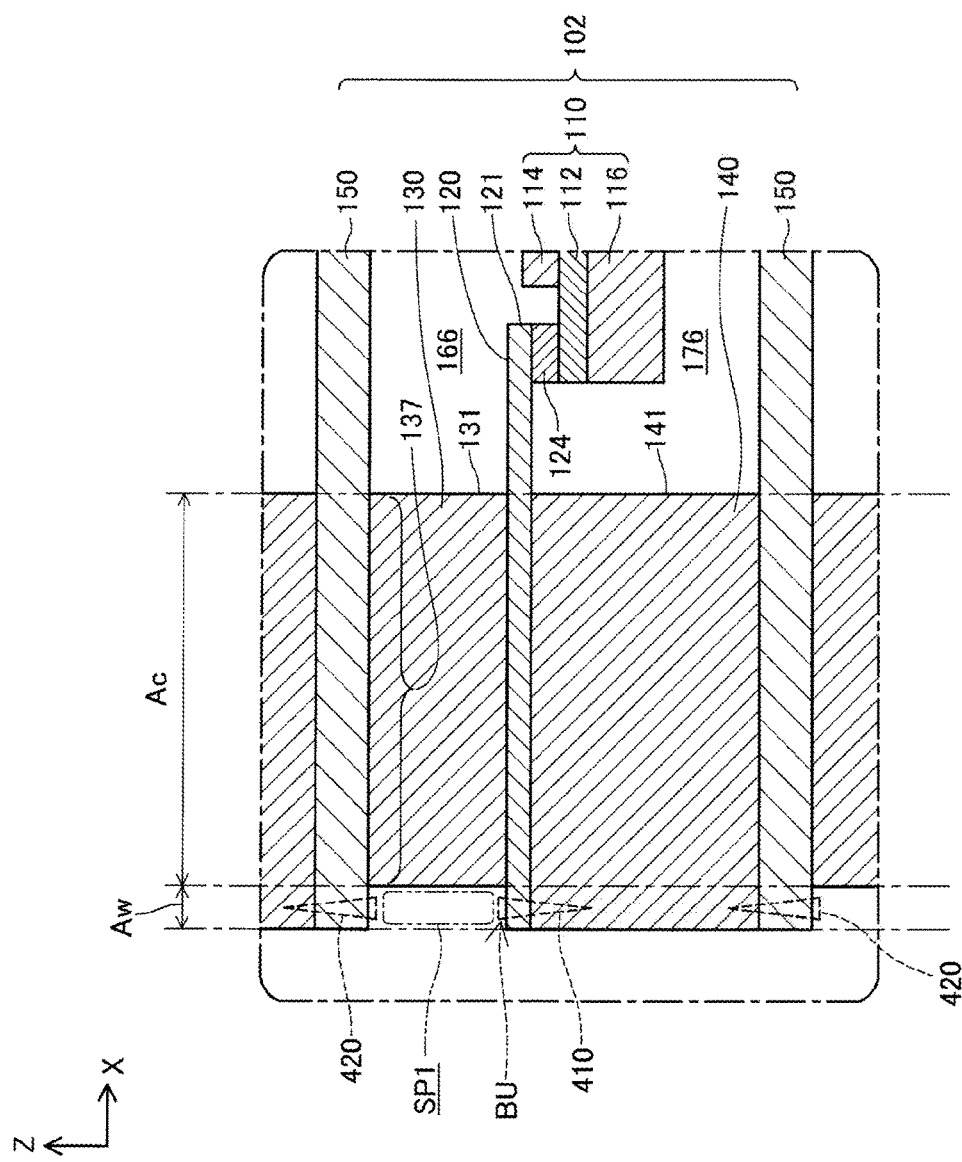
FIG. 12 Explanatory view showing an XZ section of a portion of the electricity generation unit 102 taken along line XII-XII of FIGS. 7 to 10.

A-3. Specific structure of electricity generation unit 102:

FIG. 12 is an explanatory view illustrating the specific structure of the electricity generation unit 102 according to the first embodiment. FIG. 12 is a sectional view of a portion of the electricity generation unit 102 taken along line XII-XII of FIGS. 7 to 10. As shown in FIG. 12, the anode-side frame 140 of the electricity generation unit 102 is welded to the separator 120 and the lower interconnector 150 (on the anode 116 side) of the paired interconnectors 150. The electricity generation unit 102 includes a first weld portion 410 formed for sealing between the anode-side frame 140 and the separator 120 and a second weld portion 420 formed for sealing between the anode-side frame 140 and the interconnector 150. The first and second weld portions 410 and 420 are formed by means of, for example, laser welding. Protrusions BU (e.g., beads) are formed during formation of the first and second weld portions 410 and 420. The protrusions BU may reduce the flatness of the surfaces where the weld portions are formed.

As shown in FIGS. 8 and 9, the first weld portion 410 sealing between the anode-side frame 140 and the separator 120 is continuously formed along the perimeter about the Z-axis direction of the electricity generation unit 102. Similarly, as shown in FIGS. 8 and 10, the second weld portion 420 sealing between the anode-side frame 140 and the interconnector 150 is continuously formed along the perimeter about the Z-axis direction of the electricity generation unit 102.

As shown in FIG. 12, the external dimensions of the cathode-side frame 130 are smaller than those of the anode-side frame 140 or the interconnectors 150 in a direction perpendicular to the Z-axis direction (hereinafter may be referred to as "planar direction"). Thus, the cathode-side frame 130 does not overlap with the first and second weld portions 410 and 420 in the Z-axis direction. The electricity generation unit 102 has a weld overlap region Aw overlapping with the first and second weld portions 410 and 420 in the Z-axis direction, and a space SP1 is present in a portion of the weld overlap region Aw, the portion overlapping with the cathode-side frame 130 in the planar direction. Thus, if a pressure is applied to the fuel cell stack 100 in the Z-axis direction, an excessive pressure is not applied to the weld overlap region Aw by virtue of the presence of the space SP1, thereby preventing the deformation or displacement of each member, which may occur due to the presence of the protrusions EU formed on the first and second weld portions 410 and 420.

A portion of the cathode-side frame 130 which is in contact with the surface of the separator 120 and the surface of the interconnector 150 functions as a contact portion 137 for sealing the cathode chamber 166. As shown in the sectional view of FIG. 12, the entire cathode-side frame 130 serves as the contact portion 137. In the planar direction, the distance between the contact portion 137 and the periphery of the single cell 110 is smaller than the distance between the first or second weld portion 410 or 420 and the periphery of the single cell 110. The electricity generation unit 102 has a contact overlap region Ac overlapping with the contact portion 137 in the Z-axis direction, and any of the cathode-side frame 130, the separator 120, the anode-side frame 140, and the interconnectors 150 is present anywhere in the contact overlap region Ac; i.e., no space is present in the contact overlap region Ac. In the first embodiment, each of the cathode-side frame 130, the separator 120, the anode-side frame 140, and the upper and lower interconnectors 150 is present in the contact overlap region Ac.

As described below, the aforementioned configuration of the electricity generation unit 102 of the first embodiment can prevent a reduction in electricity generation efficiency while preventing impairment of gas sealing of the cathode chamber 166 by the cathode-side frame 130 due to the presence of the protrusions BU on the first and second weld portions 410 and 420.

Figure 13:
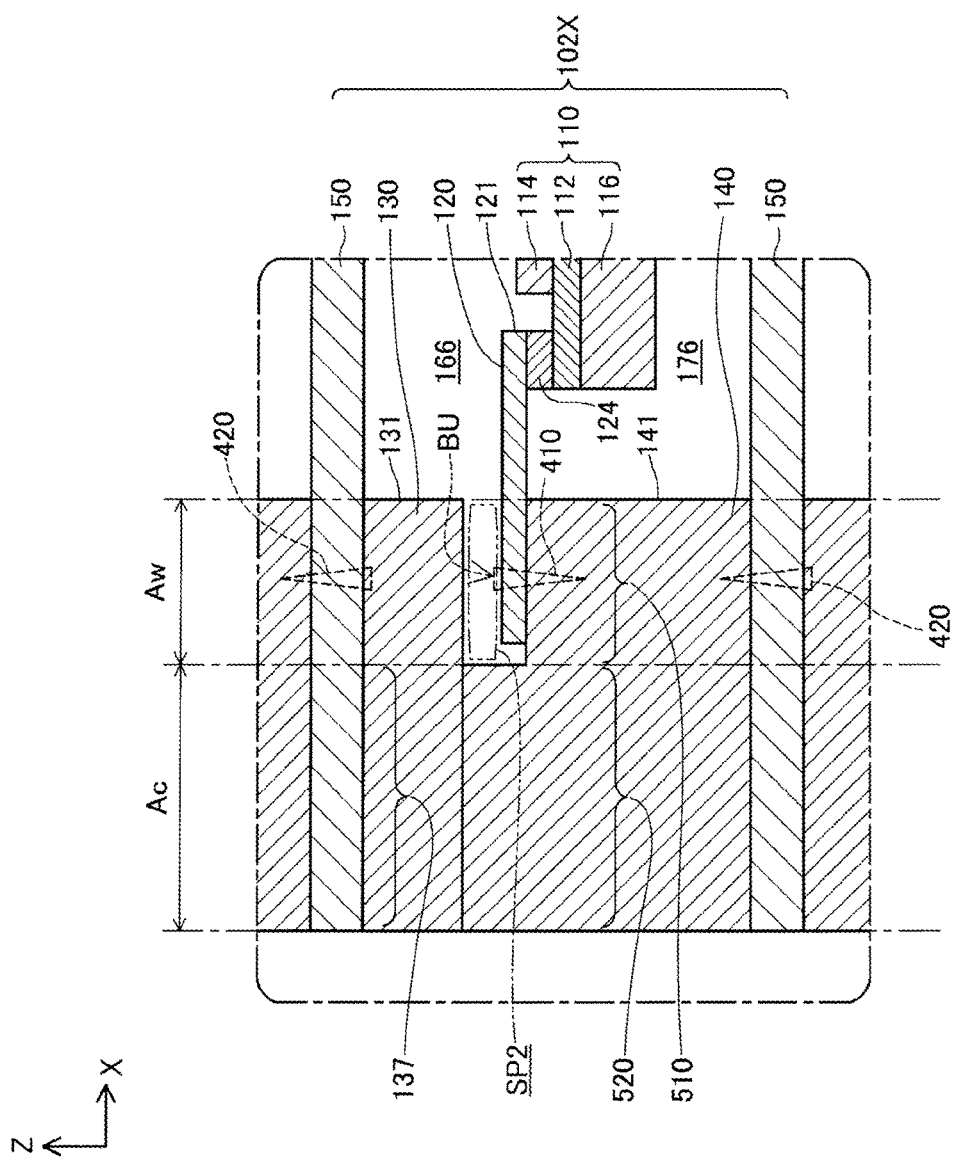
FIG. 13 Explanatory view showing an XZ section of a portion of a comparative electricity generation unit 102X.

FIG. 13 is an explanatory view illustrating the specific structure of a comparative electricity generation unit 102X. The comparative electricity generation unit 102X shown in FIG. 13 includes an anode-side frame 140 having a stepped structure formed of a thin plate portion 510 and a thick plate portion 520 disposed outside of the thin plate portion 510 (i.e., on the side more remote from the periphery of a single cell 110) in the planar direction. A first weld portion 410 sealing between a separator 120 and the anode-side frame 140 is formed at the thin plate portion 510. Thus, the comparative electricity generation unit 102X secures a space SP2 accommodating the protrusion BU of the first weld portion 410. A portion of a cathode-side frame 130 which faces the thick plate portion 520 of the anode-side frame 140 functions as a contact portion 137. Accordingly, the comparative electricity generation unit 102X can prevent impairment of gas sealing of a cathode chamber 166 by the cathode-side frame 130 due to the presence of the protrusion BU of the first weld portion 410.

However, in the comparative electricity generation unit 102X, the contact portion 137 of the cathode-side frame 130 for sealing the cathode chamber 166 is located outside of the first weld portion 410 in the planar direction. Thus, in the inside of the contact portion 137 (i.e., on the side closer to the periphery of the single cell 110), the space SP2 accommodating the protrusion EU of the first weld portion 410 communicates with the cathode chamber 166, and the space SP2 serves as a bypass of oxidizer gas OG. In such a case, a portion of the oxidizer gas OG may be discharged from the cathode chamber 166 without contributing to generation of electricity, leading to a reduction in electricity generation efficiency.

In contrast, as shown in FIG. 12, in the electricity generation unit 102 of the first embodiment, the first and second weld portions 410 and 420 are formed at a position whose distance from the periphery of the single cell 110 in the planar direction is greater than the distance between the periphery and the contact portion 137 (i.e., the distance between the periphery and the contact overlap region Ac corresponding to the contact portion 137). Thus, the contact portion 137 can effectively seal the cathode chamber 166 without being affected by the protrusions BU formed on the first and second weld portions 410 and 420. In the first embodiment, the space SP1 is present in the weld overlap region Aw of the electricity generation unit 102, and any member (no space) is present anywhere in the contact overlap region Ac of the electricity generation unit 102 (i.e., each of the cathode-side frame 130, the separator 120, the anode-side frame 140, and the upper and lower interconnectors 150 is present in the contact overlap region Ac of the electricity generation unit 102). Thus, the deformation or displacement of the contact portion 137 (which may be caused by the protrusions BU) can be prevented, and the contact portion 137 can reliably seal the cathode chamber 166. In the electricity generation unit 102 of the first embodiment, the contact portion 137 prevents communication between the space SP1 present in the weld overlap region Aw and the cathode chamber 166. Thus, the space SP1 does not serve as a bypass of the oxidizer gas OG, and a reduction in electricity generation efficiency can be prevented.

In the electricity generation unit 102 of the present embodiment, the aforementioned effect is obtained only by adjustment of the shape of the cathode-side frame 130. Thus, a simple and efficient production process can be achieved as compared with the case where, for example, grooves are formed in a metal member (e.g., the anode-side frame 140 or the interconnector 150).

In the electricity generation unit 102 of the present embodiment, the lower interconnector 150 (on the anode 116 side) of the paired interconnectors 150 corresponds to the first interconnector appearing in CLAIMS; the upper interconnector 150 (on the cathode 114 side) corresponds to the second interconnector appearing in CLAIMS; the anode chamber 176 corresponds to the first chamber appearing in CLAIMS; the cathode chamber 166 corresponds to the second chamber appearing in CLAIMS; the Z-axis direction (vertical direction) corresponds to the first direction appearing in CLAIMS; and the direction perpendicular to the Z-axis direction (planar direction) corresponds to the second direction appearing in CLAIMS.

Figure 14:
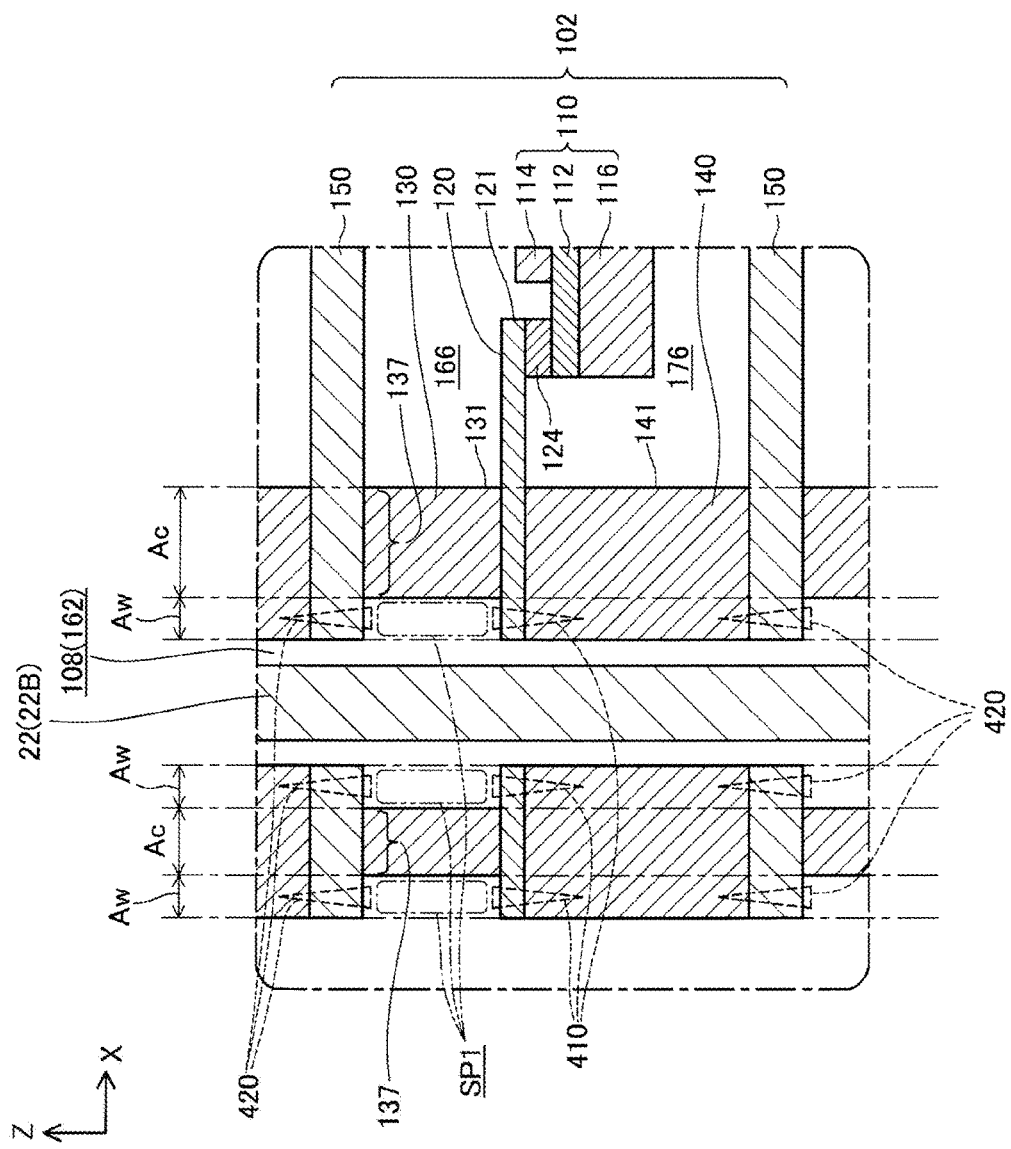
FIG. 14 Another explanatory view showing an XZ section of a portion of the electricity generation unit 102 according to the first embodiment.

In the present embodiment, the first and second weld portions 410 and 420 are formed along the perimeter about the Z-axis direction of the electricity generation unit 102 as described above, and are also formed at positions surrounding the communication holes 108. FIG. 14 is another explanatory view illustrating the specific structure of the electricity generation unit 102 according to the first embodiment. FIG. 14 is a sectional view of a portion of the electricity generation unit 102 at the same position as shown in FIG. 5. As shown in FIGS. 14 and 8 to 10, the first and second weld portions 410 and 420 are formed at positions surrounding the communication holes 108. The cathode-side frame 130 is formed so as not to overlap with the first and second weld portions 410 and 420 formed at these positions. Namely, the diameters of the through holes forming the communication holes 108 in the cathode-side frame 130 are greater than the diameters of the through holes forming the communication holes 108 in the anode-side frame 140 or the interconnector 150. Thus, in the electricity generation unit 102 of the present embodiment, the impairment of gas sealing by the cathode-side frame 130 can be prevented in the communication holes 108.

Figure 15:
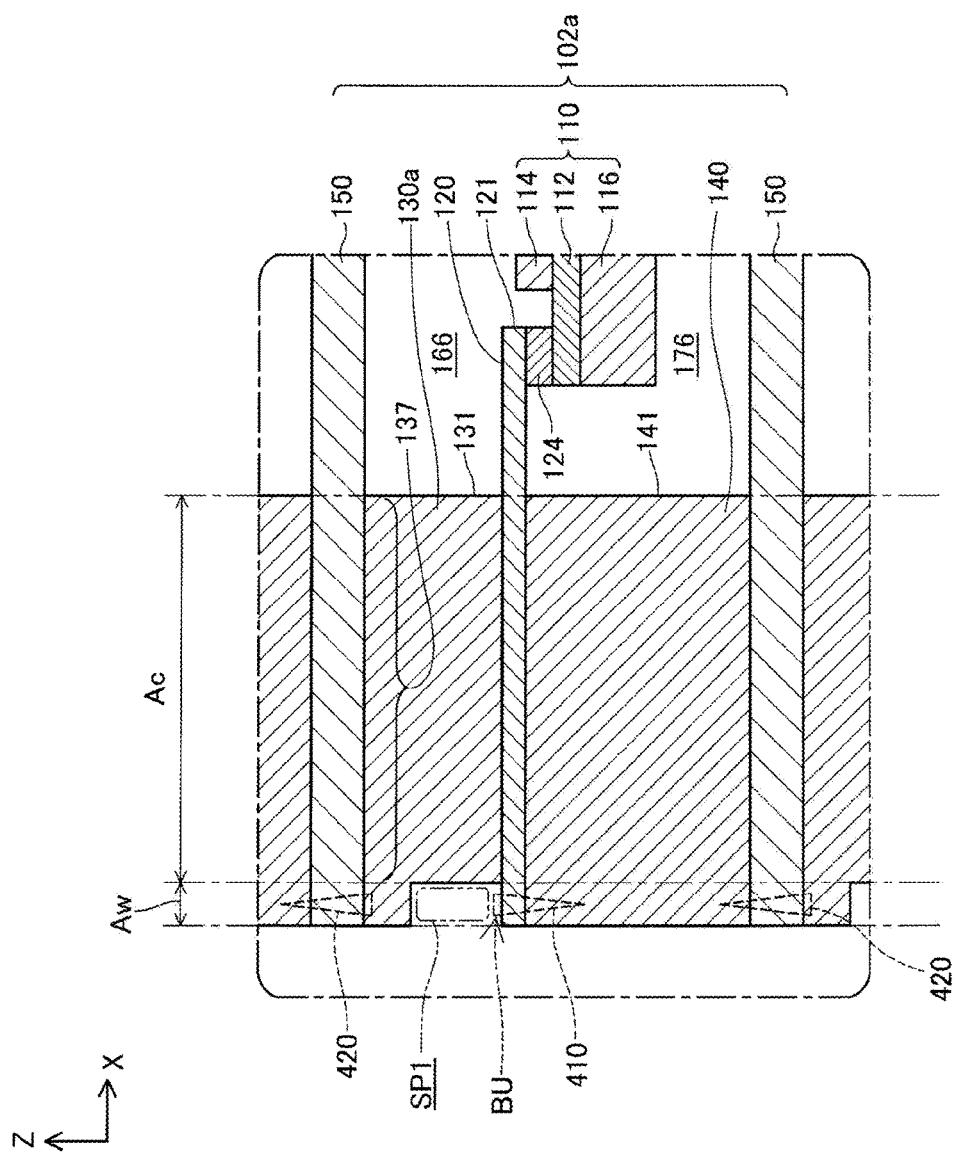
FIG. 15 Explanatory view showing an XZ section of a portion of an electricity generation unit 102a according to a second embodiment.

B. Second embodiment:

FIG. 15 is an explanatory view illustrating the specific structure of an electricity generation unit 102a according to a second embodiment. The electricity generation unit 102a of the second embodiment differs from the electricity generation unit 102 of the first embodiment shown in FIG. 12 in terms of the structure of a cathode-side frame 130a. The other components of the electricity generation unit 102a of the second embodiment, which are the same as those in the first embodiment, are denoted by the same reference numerals, and description thereof is omitted.

As described above, in the electricity generation unit 102 of the first embodiment shown in FIG. 12, the cathode-side frame 130 is formed so as not to overlap with the first and second weld portions 410 and 420 in the Z-axis direction. In contrast, in the electricity generation unit 102a of the second embodiment shown in FIG. 15, the cathode-side frame 130a overlaps with the first and second weld portions 410 and 420 in the Z-axis direction. However, in the overlap region, the cathode-side frame 130a is partially removed from its surface facing the separator 120, and the thickness of the cathode-side frame 130a in the weld overlap region Aw is smaller than that in the remaining region. Thus, in the weld overlap region Aw of the electricity generation unit 102a of the second embodiment, the space SP1 is formed such that the space SP1 overlaps with the cathode-side frame 130a in the planar direction.

In the electricity generation unit 102a of the second embodiment, the first and second weld portions 410 and 420 are formed at a position whose distance from the periphery of the single cell 110 in the planar direction is greater than the distance between the periphery and the contact portion 137 (i.e., the distance between the periphery and the contact overlap region Ac corresponding to the contact portion 137) as in the case of the electricity generation unit 102 of the first embodiment. Thus, the contact portion 137 can effectively seal the cathode chamber 166 without being affected by the protrusions BU formed on the first and second weld portions 410 and 420. Since the contact portion 137 prevents communication between the space SP1 present in the weld overlap region Aw and the cathode chamber 166, the space SP1 does not serve as a bypass of the oxidizer gas OG, and a reduction in electricity generation efficiency can be prevented. The aforementioned effect is obtained only by adjustment of the shape of the cathode-side frame 130a. Thus, a simple and efficient production process can be achieved as compared with the case where, for example, grooves are formed in a metal member (e.g., the anode-side frame 140 or the interconnector 150).

In the second embodiment, the protrusion BU of the first weld portion 410 faces the space SP1, but the protrusion BU of the second weld portion 420 does not face the space SP1. However, since the space SP1 present in the weld overlap region Aw buffers the deformation or displacement of each member caused by the protrusion BU formed on the first weld portion 410 and the deformation or displacement of each member caused by the protrusion BU formed on the second weld portion 420, the contact portion 137 can effectively seal the cathode chamber 166. Thus, if a pressure is applied to the fuel cell stack 100 in the Z-axis direction, an excessive pressure is not applied to the weld overlap region Aw by virtue of the presence of the space SP1, thereby preventing the deformation or displacement of each member, which may occur due to the presence of the protrusions BU formed on the first and second weld portions 410 and 420. In the second embodiment, the cathode-side frame 130a is partially removed from its surface facing the interconnector 150 (instead of the surface facing the separator 120) such that the thickness of the cathode-side frame 130a in the weld overlap region Aw is smaller than that in the remaining region.

Figure 16:
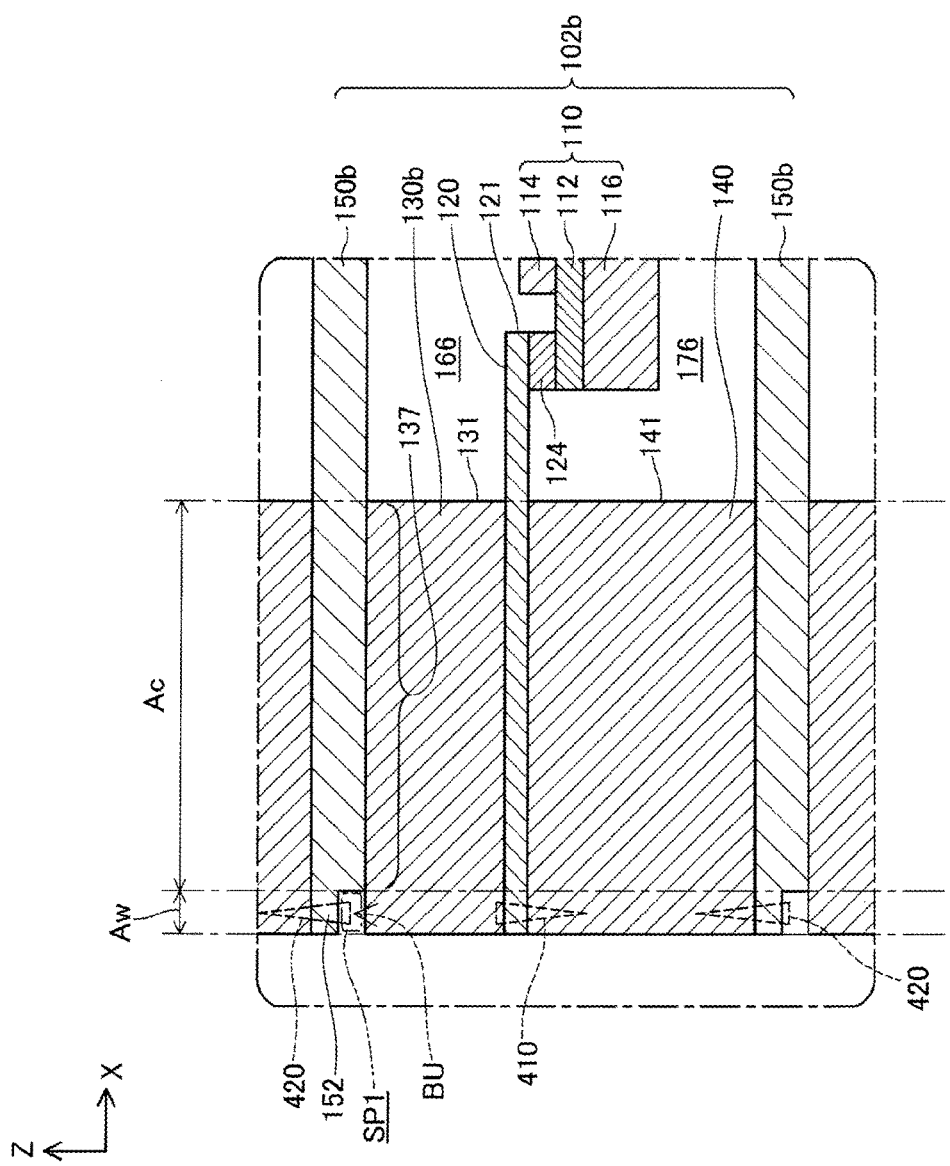
FIG. 16 Explanatory view showing an XZ section of a portion of an electricity generation unit 102b according to a third embodiment.

C. Third Embodiment:

FIG. 16 is an explanatory view illustrating the specific structure of an electricity generation unit 102b according to a third embodiment. The electricity generation unit 102b of the third embodiment differs from the electricity generation unit 102 of the first embodiment shown in FIG. 12 in terms of the structures of an interconnector 150b and a cathode-side frame 130b. The other components of the electricity generation unit 102b of the third embodiment, which are the same as those in the first embodiment, are denoted by the same reference numerals, and description thereof is omitted.

In the electricity generation unit 102b of the third embodiment, the interconnector 150b has a thin plate portion 152 overlapping with the first and second weld portions 410 and 420 in the Z-axis direction. The thin plate portion 152 is formed through grooving of the interconnector 150b from its surface facing the cathode-side frame 130b such that the interconnector 150b is thinned in the Z-axis direction. The second weld portion 420 sealing between the interconnector 150b and the anode-side frame 140 is formed at the thin plate portion 152. In the weld overlap region Aw (overlapping with the first and second weld portions 410 and 420 in the Z-axis direction) of the electricity generation unit 102b of the third embodiment, the space SP1 is formed such that the space SP1 overlaps with the interconnector 150b in the planar direction.

In the electricity generation unit 102b of the third embodiment, the cathode-side frame 130b is formed so as to overlap with the first and second weld portions 410 and 420 in the Z-axis direction. Thus, the external dimensions of the cathode-side frame 130b are equal to those of the anode-side frame 140 or interconnector 150b in the planar direction.

In the electricity generation unit 102b of the third embodiment, the first and second weld portions 410 and 420 are formed at a position whose distance from the periphery of the single cell 110 in the planar direction is greater than the distance between the periphery and the contact portion 137 (i.e., the distance between the periphery and the contact overlap region Ac corresponding to the contact portion 137) as in the case of the electricity generation unit 102 of the first embodiment. Thus, the contact portion 137 can effectively seal the cathode chamber 166 without being affected by the protrusions BU formed on the first and second weld portions 410 and 420. Since the contact portion 137 prevents communication between the space SP1 present in the weld overlap region Aw and the cathode chamber 166, the space SP1 does not serve as a bypass of the oxidizer gas OG, and a reduction in electricity generation efficiency can be prevented.

In the electricity generation unit 102b of the third embodiment, no limitation is imposed on the shape of the cathode-side frame 130b for the purpose of securing the space SP1 in the weld overlap region Aw. Thus, the contour of the cathode-side frame 130b can be readily aligned with that of the separator 120 or the anode-side frame 140, thereby improving assembly accuracy.

In the third embodiment, the protrusion BU of the second weld portion 420 faces the space SP1, but the protrusion BU of the first weld portion 410 does not face the space SP1. However, since the space SP1 present in the weld overlap region Aw buffers the deformation or displacement of each member caused by the protrusion BU formed on the second weld portion 420 and the deformation or displacement of each member caused by the protrusion BU formed on the first weld portion 410, the contact portion 137 can effectively seal the cathode chamber 166.

Figure 17:
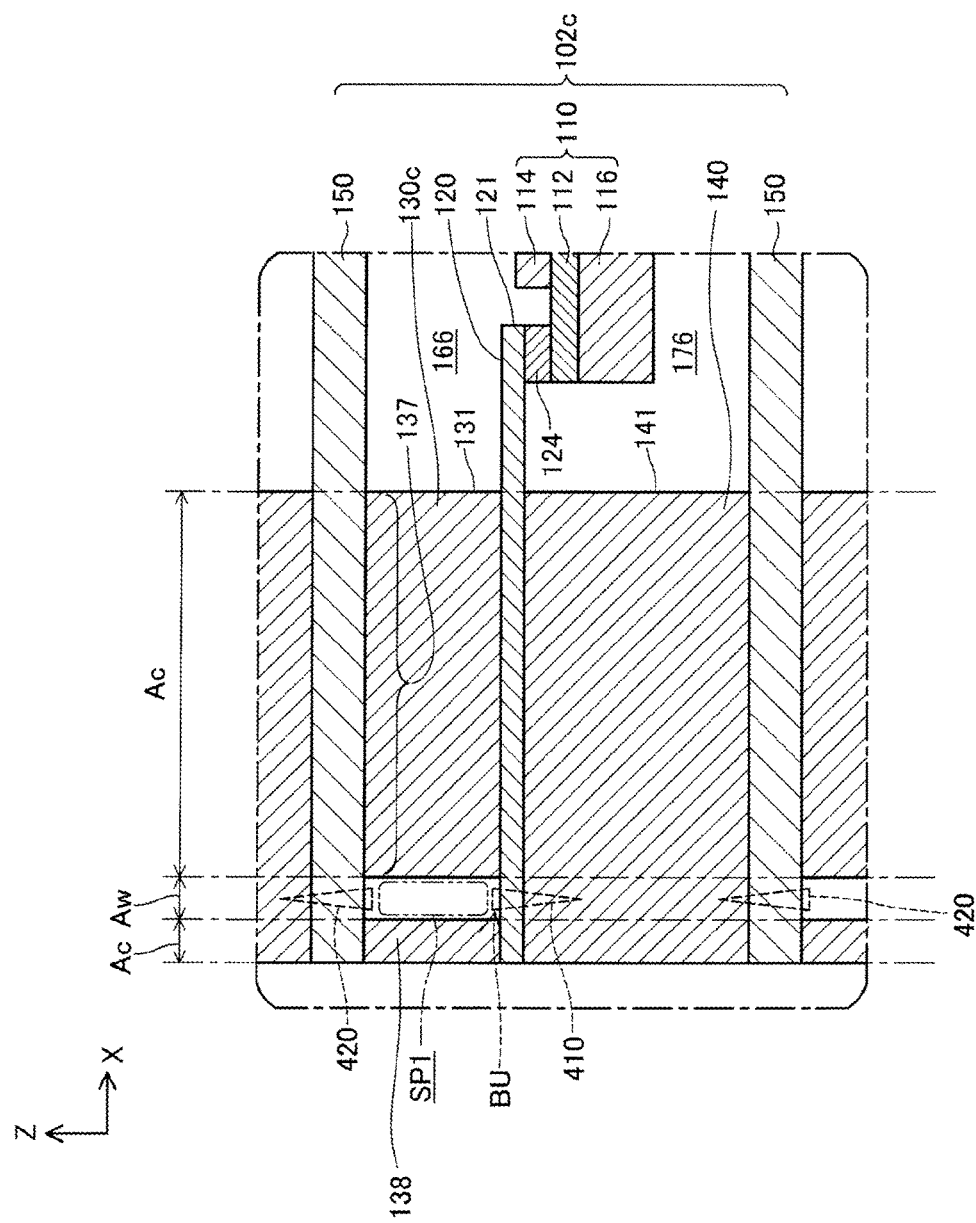
FIG. 17 Explanatory view showing an XZ section of a portion of an electricity generation unit 102c according to a fourth embodiment.

D. Fourth Embodiment:

FIG. 17 is an explanatory view illustrating the specific structure of an electricity generation unit 102c according to a fourth embodiment. The electricity generation unit 102c of the fourth embodiment differs from the electricity generation unit 102 of the first embodiment shown in FIG. 12 in terms of the structure of a cathode-side frame 130c. The other components of the electricity generation unit 102c of the fourth embodiment, which are the same as those in the first embodiment, are denoted by the same reference numerals, and description thereof is omitted.

In the electricity generation unit 102c of the fourth embodiment, the first and second weld portions 410 and 420 are formed at a position whose distance from the periphery of the single cell 110 in the planar direction is greater than the distance between the periphery and the contact portion 137 (i.e., the distance between the periphery and the contact overlap region Ac corresponding to the contact portion 137) as in the case of the electricity generation unit 102 of the first embodiment. In the electricity generation unit 102c of the fourth embodiment, a portion of the cathode-side frame 130c is present at a position whose distance from the periphery of the single cell 110 in the planar direction is greater than the distance between the periphery and the first and second weld portions 410 and 420. Similar to the case of the contact portion 137, the portion of the cathode-side frame 130c functions as a second contact portion 138 which is in contact with the surface of the separator 120 and the surface of the interconnector 150, thereby sealing between the separator 120 and the interconnector 150.

In the electricity generation unit 102c of the fourth embodiment, the first and second weld portions 410 and 420 are formed at a position whose distance from the periphery of the single cell 110 in the planar direction is greater than the distance between the periphery and the contact portion 137 (i.e., the distance between the periphery and the contact overlap region Ac corresponding to the contact portion 137) as in the case of the electricity generation unit 102 of the first embodiment. Thus, the contact portion 137 can effectively seal the cathode chamber 166 without being affected by the protrusions BU formed on the first and second weld portions 410 and 420. Since the contact portion 137 prevents communication between the space SP1 present in the weld overlap region Aw and the cathode chamber 166, the space SP1 does not serve as a bypass of the oxidizer gas OG, and a reduction in electricity generation efficiency can be prevented. The aforementioned effect is obtained only by adjustment of the shape of the cathode-side frame 130c. Thus, a simple and efficient production process can be achieved as compared with the case where, for example, grooves are formed in a metal member (e.g., the anode-side frame 140 or the interconnector 150).

In the electricity generation unit 102c of the fourth embodiment, the space SP1 is closed by means of the second contact portion 138. Thus, a sealing material (e.g., glass sealing material) can be readily disposed in the space SP1, thereby further improving the gas sealing property.

Figure 18:
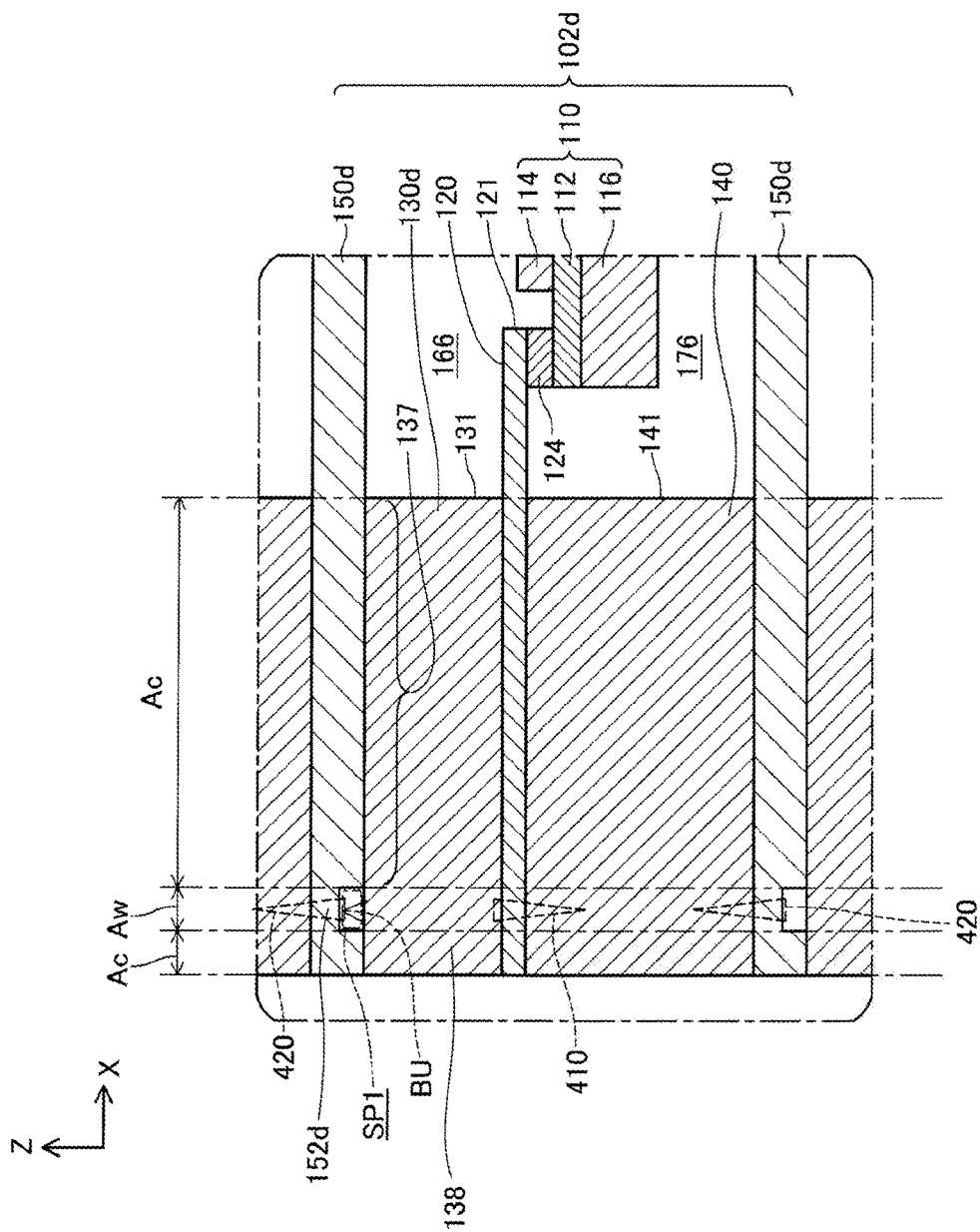
FIG. 18 Explanatory view showing an XZ section of a portion of an electricity generation unit 102d according to a fifth embodiment.

E. Fifth Embodiment:

FIG. 18 is an explanatory view illustrating the specific structure of an electricity generation unit 102d according to a fifth embodiment. The electricity generation unit 102d of the fifth embodiment differs from the electricity generation unit 102b of the third embodiment shown in FIG. 16 in terms of the structures of a cathode-side frame 130d and an interconnector 150d. The other components of the electricity generation unit 102d of the fifth embodiment, which are the same as those in the third embodiment, are denoted by the same reference numerals, and description thereof is omitted.

In the electricity generation unit 102d of the fifth embodiment, the interconnector 150d has a thin plate portion 152d overlapping with the first and second weld portions 410 and 420 in the Z-axis direction as in the case of the electricity generation unit 102b of the third embodiment. Thus, in the weld overlap region Aw (overlapping with the first and second weld portions 410 and 420 in the Z-axis direction) of the electricity generation unit 102d, the space SP1 is formed such that the space SP1 overlaps with the interconnector 150d in the planar direction. In the electricity generation unit 102d of the fifth embodiment, the thin plate portion 152d is formed inside of the outer periphery of the interconnector 150d. In the electricity generation unit 102d of the fifth embodiment, a portion of the cathode-side frame 130d is present at a position whose distance from the periphery of the single cell 110 in the planar direction is greater than the distance between the periphery and the first and second weld portions 410 and 420. Similar to the case of the contact portion 137, the portion of the cathode-side frame 130d functions as a second contact portion 138 which is in contact with the surface of the separator 120 and the surface of the interconnector 150, thereby sealing between the separator 120 and the interconnector 150.

In the electricity generation unit 102d of the fifth embodiment, the first and second weld portions 410 and 420 are formed at a position whose distance from the periphery of the single cell 110 in the planar direction is greater than the distance between the periphery and the contact portion 137 (i.e., the distance between the periphery and the contact overlap region Ac corresponding to the contact portion 137) as in the case of the electricity generation unit 102b of the third embodiment. Thus, the contact portion 137 can effectively seal the cathode chamber 166 without being affected by the protrusions BU formed on the first and second weld portions 410 and 420. Since the contact portion 137 prevents communication between the space SP1 present in the weld overlap region Aw and the cathode chamber 166, the space SP1 does not serve as a bypass of the oxidizer gas OG, and a reduction in electricity generation efficiency can be prevented.

In the electricity generation unit 102d of the fifth embodiment, no limitation is imposed on the shape of the cathode-side frame 130d for the purpose of securing the space SP1 in the weld overlap region Aw. Thus, the contour of the cathode-side frame 130d can be readily aligned with that of the separator 120 or the anode-side frame 140, thereby improving assembly accuracy.

In the electricity generation unit 102d of the fifth embodiment, the space SP1 is closed by means of the second contact portion 138. Thus, a sealing material (e.g., glass sealing material) can be readily disposed in the space SP1, thereby further improving the gas sealing property.

In the fifth embodiment, the protrusion BU of the second weld portion 420 faces the space SP1, but the protrusion BU of the first weld portion 410 does not face the space SP1. However, since the space SP1 present in the weld overlap region Aw buffers the deformation or displacement of each member caused by the protrusion BU formed on the second weld portion 420 and the deformation or displacement of each member caused by the protrusion BU formed on the first weld portion 410, the contact portion 137 can effectively seal the cathode chamber 166.

Figure 19:
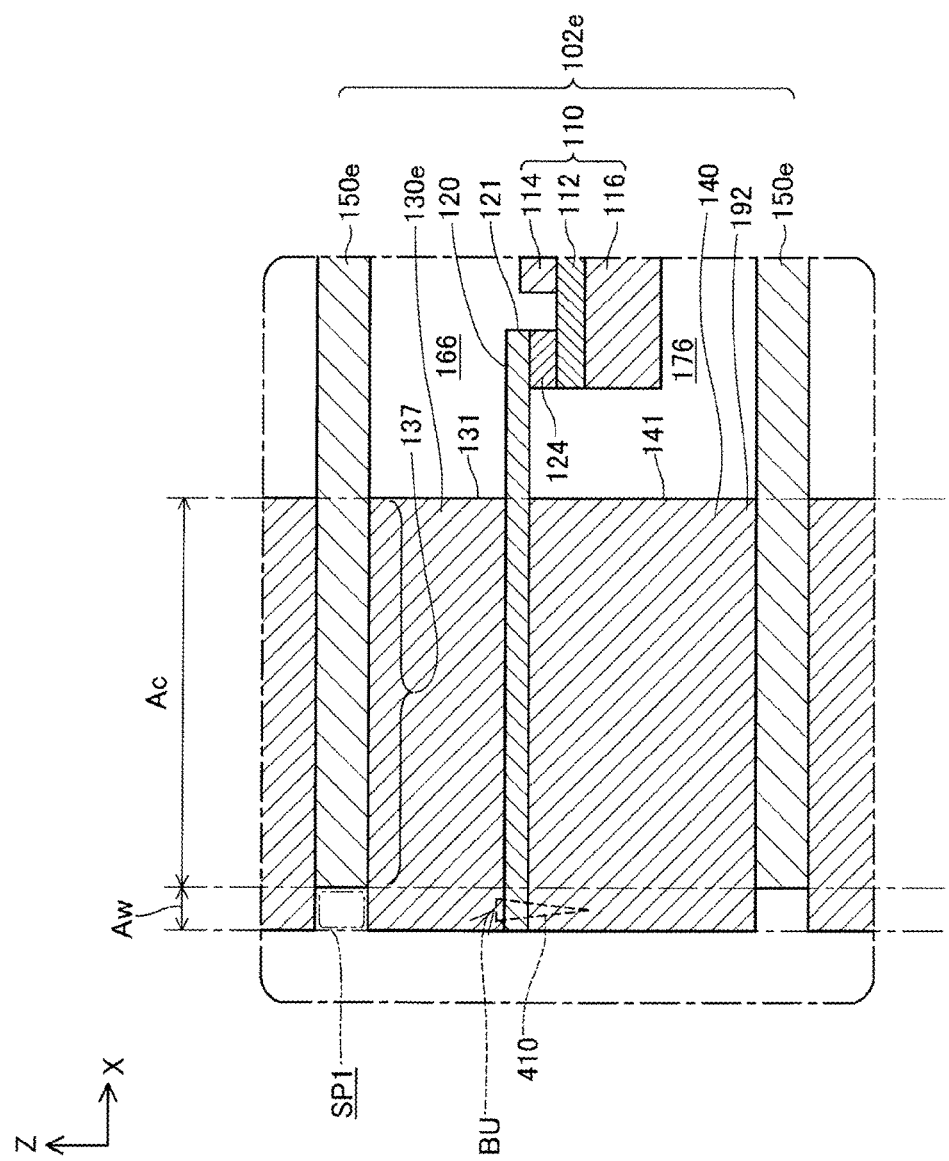
FIG. 19 Explanatory view showing an XZ section of a portion of an electricity generation unit 102e according to a sixth embodiment.

F. Sixth Embodiment:

FIG. 19 is an explanatory view illustrating the specific structure of an electricity generation unit 102e according to a sixth embodiment. The electricity generation unit 102e of the sixth embodiment differs from the electricity generation unit 102b of the third embodiment shown in FIG. 16 in terms of the structure of an interconnector 150e. The other components of the electricity generation unit 102e of the sixth embodiment, which are the same as those in the third embodiment, are denoted by the same reference numerals, and description thereof is omitted.

In the electricity generation unit 102e of the sixth embodiment, the interconnector 150e is formed so as not to overlap with the first and second weld portions 410 and 420 in the Z-axis direction. Accordingly, the external dimensions of the interconnector 150e are smaller than those of the anode-side frame 140 or the cathode-side frame 130e in the planar direction. Thus, in the weld overlap region Aw (overlapping with the first and second weld portions 410 and 420 in the Z-axis direction) of the electricity generation unit 102e, the space SP1 is formed such that the space SP1 overlaps with the interconnector 150e in the planar direction. In the present embodiment, no second weld portion 420 is formed for sealing between the anode-side frame 140 and the interconnector 150.

In the electricity generation unit 102e of the sixth embodiment, the first weld portion 410 is formed at a position whose distance from the periphery of the single cell 110 in the planar direction is greater than the distance between the periphery and the contact portion 137 (i.e., the distance between the periphery and the contact overlap region Ac corresponding to the contact portion 137) as in the case of the electricity generation unit 102b of the third embodiment. Thus, the contact portion 137 can effectively seal the cathode chamber 166 without being affected by the protrusion BU formed on the first weld portion 410. Since the contact portion 137 prevents communication between the space SP1 present in the weld overlap region Aw and the cathode chamber 166, the space SP1 does not serve as a bypass of the oxidizer gas OG, and a reduction in electricity generation efficiency can be prevented.

In the electricity generation unit 102e of the sixth embodiment, no limitation is imposed on the shape of the cathode-side frame 130e for the purpose of securing the space SP1 in the weld overlap region Aw. Thus, the contour of the cathode-side frame 130e can be readily aligned with that of the separator 120 or the anode-side frame 140, thereby improving assembly accuracy.

In the electricity generation unit 102e of the sixth embodiment, the space SP1 can be secured in the weld overlap region Aw without an intricate process (e.g., grooving) for forming the thin plate portion 152 in the interconnector 150b in the third embodiment.

In the sixth embodiment, the protrusion BU of the first weld portion 410 does not face the space SP1. However, since the space SP1 present in the weld overlap region Aw buffers the deformation or displacement of each member caused by the protrusion BU formed on the first weld portion 410, the contact portion 137 can effectively seal the cathode chamber 166.

Figure 20:
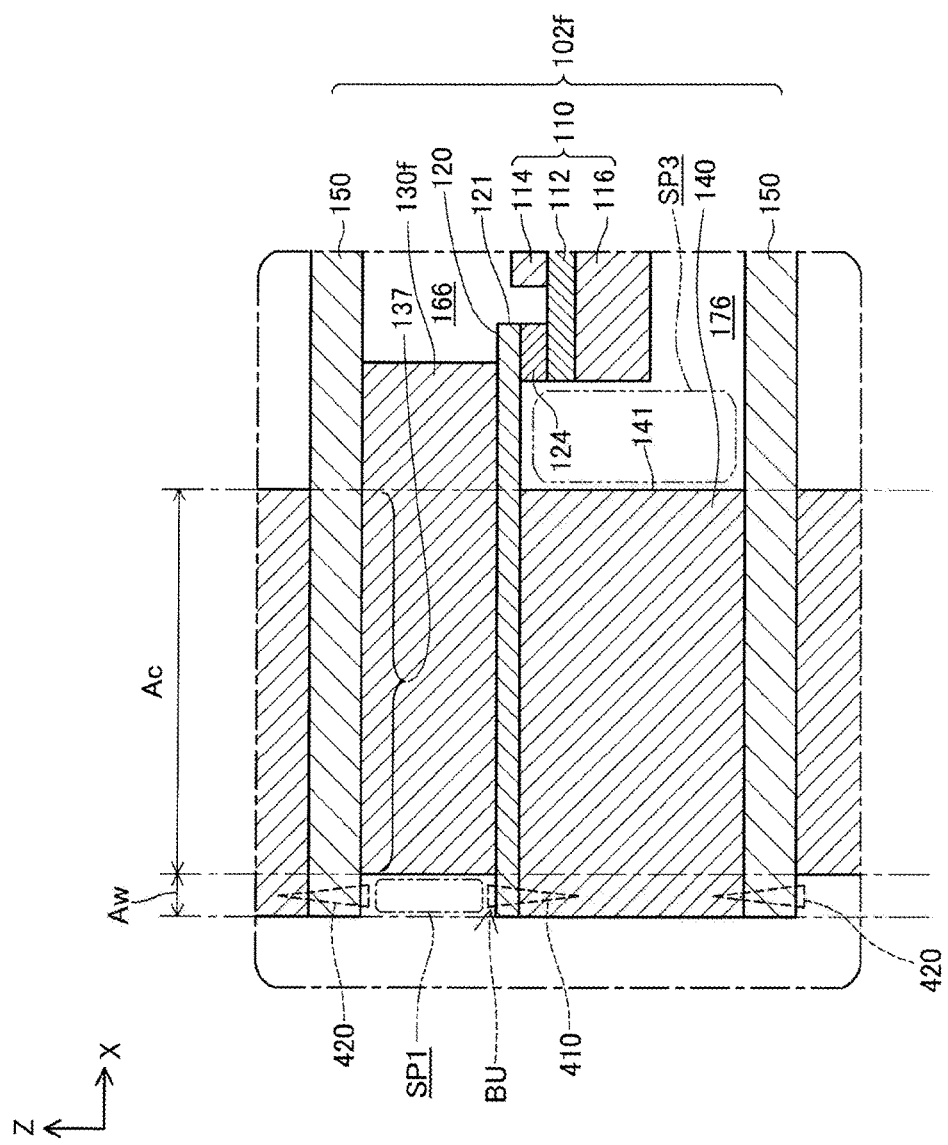
FIG. 20 Explanatory view showing an XZ section of a portion of an electricity generation unit 102f according to a seventh embodiment.

G. Seventh Embodiment:

FIG. 20 is an explanatory view illustrating the specific structure of an electricity generation unit 102f according to a seventh embodiment. The electricity generation unit 102f of the seventh embodiment differs from the electricity generation unit 102 of the first embodiment shown in FIG. 12 in terms of the structure of a cathode-side frame 130f. The other components of the electricity generation unit 102f of the seventh embodiment, which are the same as those in the first embodiment, are denoted by the same reference numerals, and description thereof is omitted.

In the electricity generation unit 102f of the seventh embodiment, the cathode-side frame 130f extends further inwardly in the planar direction, as compared with the case of the electricity generation unit 102 of the first embodiment. Thus, the cathode-side frame 130f overlaps with a space SP3 present between the anode-side frame 140 and the single cell 110 in the Z-axis direction.

In the electricity generation unit 102f of the seventh embodiment, the first and second weld portions 410 and 420 are formed at a position whose distance from the periphery of the single cell 110 in the planar direction is greater than the distance between the periphery and the contact portion 137 (i.e., the distance between the periphery and the contact overlap region Ac corresponding to the contact portion 137) as in the case of the electricity generation unit 102 of the first embodiment. Thus, the contact portion 137 can effectively seal the cathode chamber 166 without being affected by the protrusions EU formed on the first and second weld portions 410 and 420. Since the contact portion 137 prevents communication between the space SP1 present in the weld overlap region Aw and the cathode chamber 166, the space SP1 does not serve as a bypass of the oxidizer gas OG, and a reduction in electricity generation efficiency can be prevented. The aforementioned effect is obtained only by adjustment of the shape of the cathode-side frame 130f. Thus, a simple and efficient production process can be achieved as compared with the case where, for example, grooves are formed in a metal member (e.g., the anode-side frame 140 or the interconnector 150).

In the electricity generation unit 102f of the seventh embodiment, the cathode-side frame 130f extends further inwardly in the planar direction. This configuration can reduce the volume of a space through which oxidizer gas OG not contributing to electricity generation flows in the cathode chamber 166, thereby further effectively preventing a reduction in electricity generation efficiency.

Figure 21:
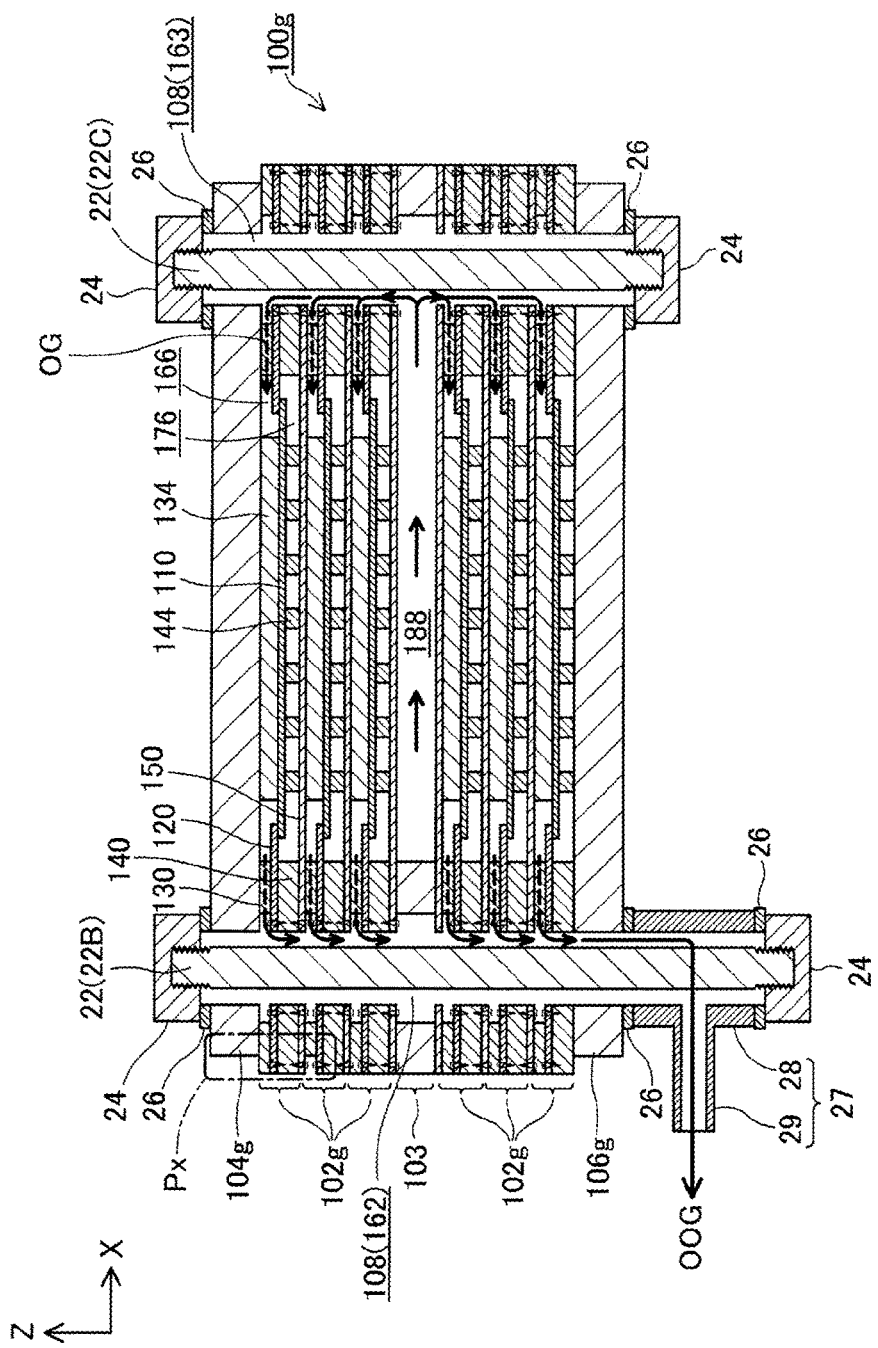
FIG. 21 Explanatory view showing an XZ section of a fuel cell stack 100g according to an eighth embodiment.
Figure 22:
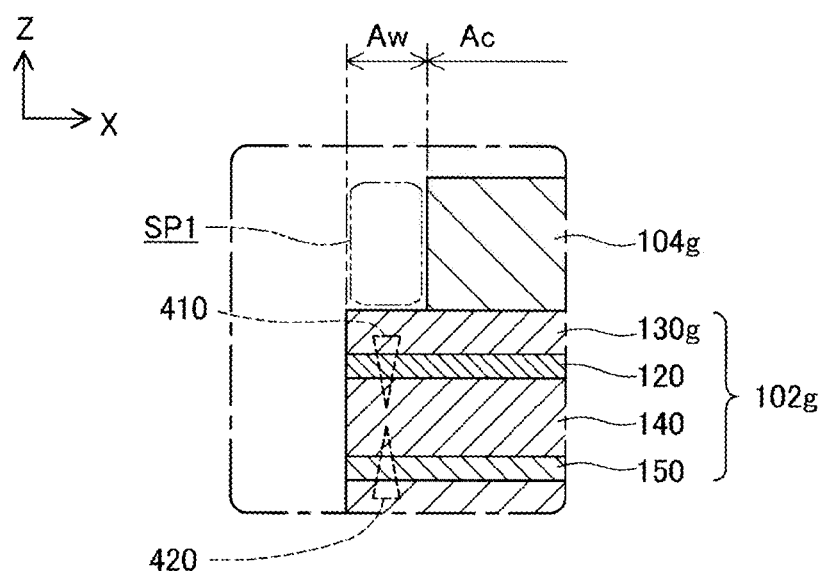
FIG. 22 Explanatory view showing an XZ section of a portion of an electricity generation unit 102g according to the eighth embodiment.

H. Eighth Embodiment:

FIG. 21 is an explanatory view schematically illustrating the structure of a fuel cell stack 100g according to an eighth embodiment. FIG. 22 is an explanatory view illustrating the specific structure of the electricity generation unit 102g according to the eighth embodiment. FIG. 21 is a sectional view of the fuel cell stack 100g at the same position as shown in FIG. 5. FIG. 22 is an enlarged view of a portion Px of FIG. 21. The fuel cell stack 100g of the eighth embodiment differs from the fuel cell stack of the first embodiment in terms of the structures of end plates 104g and 106g and an electricity generation unit 102g. The other components of the fuel cell stack 100g of the eighth embodiment, which are the same as those in the first embodiment, are denoted by the same reference numerals, and description thereof is omitted.

As shown in FIG. 22, in the eighth embodiment, a space SP1 is absent in the weld overlap region Aw of each electricity generation unit 102g. Instead, end plates 104g and 106g are formed so as not to overlap the first and second weld portions 410 and 420 in the Z-axis direction. Accordingly, the external dimensions of the end plates 104g and 106g are smaller than those of the anode-side frame 140 or the interconnector 150 in the planar direction. In the region of the fuel cell stack 100g overlapping with the first and second weld portions 410 and 420 in the Z-axis direction, the space SP1 is formed such that the space SP1 overlaps with the end plate 104g or 106g in the planar direction. Thus, when the electricity generation units 102g are sandwiched under pressure between the end plates 104g and 106g, an excessive pressure is not applied to the weld overlap region Aw by virtue of the spaces SP1 provided in the end plates 104g and 106g, thereby preventing the deformation or displacement of each member, which may occur due to the presence of the protrusions BU formed on the first and second weld portions 410 and 420. In the eighth embodiment, the cathode-side frame 130, separator 120, anode-side frame 140, and upper and lower interconnectors 150 of each electricity generation unit 102g, and the end plates 104g and 106g are present in the contact overlap region Ac.

In the eighth embodiment, the first and second weld portions 410 and 420 are formed at a position whose distance from the periphery of the single cell 110 in the planar direction is greater than the distance between the periphery and the contact portion 137 (i.e., the distance between the periphery and the contact overlap region Ac corresponding to the contact portion 137) as in the case of the first embodiment. Thus, the contact portion 137 can effectively seal the cathode chamber 166 without being affected by the protrusions BU formed on the first and second weld portions 410 and 420. Since the space SP1 does not communicate with the cathode chamber 166, the space SP1 does not serve as a bypass of the oxidizer gas OG, and a reduction in electricity generation efficiency can be prevented.

In the eighth embodiment, the end plate 104g or 106g (plate-like member), which is thicker than each member constituting the electricity generation unit 102g, has a decreased size in the planar direction, and the weight of the fuel cell stack 100g can be reduced.

I. Modifications:

The technique disclosed in the present specification is not limited to the above embodiments, but may be modified into various other forms without departing from the gist thereof. For example, the technique may be modified as described below.

In the above embodiments, the entire cathode-side frame 130 does not necessarily function as the contact portion 137, and a portion of the cathode-side frame 130 may function as the contact portion 137.

In the above embodiments, the electricity generation unit 102 does not necessarily include both the first weld portion 410 and the second weld portion 420, and the electricity generation unit 102 may include at least one of the first weld portion 410 and the second weld portion 420. In the above embodiments, the first weld portion 410 does not necessarily coincide with the second weld portion 420 in the planar direction, and they may be misaligned with each other.

In the above embodiments, the electricity generation unit 102 includes the anode-side frame 140 having the hole 141 forming the anode chamber 176; the cathode-side frame 130 having the contact portion 137 which is in contact with both the surface of the separator 120 and the surface of the interconnector 150, thereby sealing the cathode chamber 166; the first weld portion 410 formed for sealing between the separator 120 and the anode-side frame 140; and the second weld portion 420 formed for sealing between the anode-side frame 140 and the interconnector 150. In this configuration, the anode side may be transposed with the cathode side. Specifically, the electricity generation unit 102 may include a metal frame member having a through hole forming the cathode chamber 166; a gas sealing member having a contact portion which is in contact with both the surface of the separator 120 and the surface of the interconnector 150, thereby sealing the anode chamber 176; a first weld portion formed for sealing between the separator 120 and the frame member; and a second weld portion formed for sealing between the frame member and the interconnector 150.

In the above embodiments, a soft stuffing (e.g., a material having a Young's modulus lower than that of each member constituting the electricity generation unit 102) may be inserted into the space SP1.

In the above embodiments, the number of the electricity generation units 102 contained in the fuel cell stack 100 is a mere example and is determined as appropriate in accordance with, for example, a required output voltage of the fuel cell stack 100.

In the above embodiments, the position of the heat exchange member 103 in the fuel cell stack 100 in the direction of array is a mere example, and the heat exchange member 103 may be disposed at any position. Preferably, the heat exchange member 103 is disposed adjacent to the electricity generation unit 102 whose temperature becomes higher in all the electricity generation units 102 contained in the fuel cell stack 100, in order to reduce the heat distribution of the fuel cell stack 100 in the direction of array. For example, if the electricity generation unit 102 around the center (in the direction of array) of the fuel cell stack 100 is likely to exhibit a higher temperature, the heat exchange member 103 is preferably disposed around the center (in the direction of array) of the fuel cell stack 100 as in the case of the aforementioned embodiments. The fuel cell stack 100 may include two or more heat exchange members 103.

In the above embodiments, the heat exchange member 103 is adapted to increase the temperature of the oxidizer gas OG. However, the heat exchange member 103 may be adapted to increase the temperature of the fuel gas FG instead of the oxidizer gas OG, or may be adapted to increase the temperatures of the oxidizer gas OG and the fuel gas FG.

In the above embodiments, the nut 24 is engaged with each of opposite ends of the bolt 22. However, the bolt 22 may have a head, and the nut 24 may be engaged with only an end opposite the head of the bolt 22.

In the above embodiments, the end plates 104 and 106 function as output terminals. However, other members connected respectively to the end plates 104 and 106 (e.g., electrically conductive plates disposed respectively between the end plate 104 and the electricity generation unit 102 and between the end plate 106 and the electricity generation unit 102) may function as output terminals.

In the above embodiments, spaces between the outer circumferential surfaces of shaft portions of the bolts 22 and the inner circumferential surfaces of the communication holes 108 are utilized as manifolds. However, axial holes may be formed in the shaft portions of the bolts 22 for use as the manifolds. Also, the manifolds may be provided separately from the communication holes 108 into which the bolts 22 are inserted.

In the above embodiments, in the case where two electricity generation units 102 are disposed adjacent to each other, the adjacent two electricity generation units 102 share a single interconnector 150. However, even in such a case, two electricity generation units 102 may have respective interconnectors 150. Also, in the above embodiments, the uppermost electricity generation unit 102 in the fuel cell stack 100 does not have the upper interconnector 150, and the lowermost electricity generation unit 102 in the fuel cell stack 100 does not have the lower interconnector 150. However, these interconnectors 150 may be provided without elimination.

In the above embodiments, the anode-side current collector 144 may have a structure similar to that of the cathode-side current collector 134; i.e., the anode-side current collector 144 and the adjacent interconnector 150 may be integrally formed as a unitary member. The anode-side frame 140 rather than the cathode-side frame 130 may be an insulator. Also, the cathode-side frame 130 and the anode-side frame 140 may have a multilayer structure.

In the above embodiments, materials used to form the members are provided merely by way of example. Other materials may be used to form the members.

In the above embodiments, the hydrogen-rich fuel gas FG is obtained by reforming city gas. However, the fuel gas FG may be obtained from other materials, such as LP gas, kerosene, methanol, and gasoline, or pure hydrogen may be utilized as the fuel gas FG.

In the above embodiments, all the electricity generation units 102 contained in the fuel cell stack 100 are configured as described above (i.e., the first weld portion 410 and/or the second weld portion 420 is formed at a position whose distance from the periphery of the single cell 110 in the planar direction is greater than the distance between the periphery and the contact portion 137). However, if at least one electricity generation unit 102 contained in the fuel cell stack 100 is configured as described above, the configuration of the electricity generation unit 102 can prevent a reduction in electricity generation efficiency while preventing impairment of gas sealing of the cathode chamber 166 by the cathode-side frame 130 due to the presence of the protrusions BU on the first and second weld portions 410 and 420.

The above embodiments are described while referring to the solid oxide fuel cell (SOFC); however, the present invention is also applicable to other types of fuel cells, such as a polymer electrolyte fuel cell (PEFC), a phosphoric-acid fuel cell (PAFC), and a molten carbonate fuel cell (MCFC).

The technique disclosed in the present specification can also be implemented in the following modes.

(1) A fuel cell electricity generation unit comprising:

a single cell including an electrolyte layer, and a cathode and an anode which face each other in a first direction with the electrolyte layer intervening therebetween;

first and second metal interconnectors which face each other in the first direction with the single cell intervening therebetween;

a metal separator having a through hole and a portion which surrounds the through hole and is bonded to a peripheral portion of the single cell, thereby separating a cathode chamber facing the cathode from an anode chamber facing the anode;

a metal frame member disposed between the separator and the first interconnector and having a through hole forming a first chamber, which is one of the anode chamber and the cathode chamber; and a gas sealing member disposed between the separator and the second interconnector and having a contact portion which is in contact with both the surface of the separator on the side toward the second interconnector and the surface of the second interconnector on the side toward the separator, thereby sealing a second chamber, which is the other of the anode chamber and the cathode chamber, the fuel cell electricity generation unit being characterized in that:

at least one of a first weld portion sealing between the separator and the frame member and a second weld portion sealing between the frame member and the first interconnector is formed at a position whose distance from the periphery of the single cell in a second direction perpendicular to the first direction is greater than the distance between the periphery and the contact portion nearest to the single cell.

(2) A fuel cell stack comprising a plurality of fuel cell electricity generation units arranged in a first direction; and first and second metal end plates which face each other in the first direction with the fuel cell electricity generation units intervening therebetween, wherein each fuel cell electricity generation unit comprises:

a single cell including an electrolyte layer, and a cathode and an anode which face each other in the first direction with the electrolyte layer intervening therebetween;

first and second metal interconnectors which face the single cell in the first direction;

a metal separator having a through hole and a portion which surrounds the through hole and is bonded to a peripheral portion of the single cell, thereby separating a cathode chamber facing the cathode from an anode chamber facing the anode;

a metal frame member disposed between the separator and the first interconnector facing one surface of the separator, the metal frame member having a through hole forming a first chamber, which is one of the anode chamber and the cathode chamber; and a gas sealing member disposed between the separator and the second interconnector facing the surface of the separator opposite the surface facing the frame member, the gas sealing member having a contact portion which is in contact with both the surface of the separator on the side toward the second interconnector and the surface of the second interconnector on the side toward the separator, thereby sealing a second chamber, which is the other of the anode chamber and the cathode chamber, wherein at least one of a first weld portion sealing between the separator and the frame member and a second weld portion sealing between the frame member and the first interconnector is formed at a position whose distance from the periphery of the single cell in a second direction perpendicular to the first direction is greater than the distance between the periphery and the contact portion nearest to the single cell.

DESCRIPTION OF REFERENCE NUMERALS

22: bolt; 24: nut; 26: insulation sheet; 27: gas passage member; 28: body portion; 29: branch portion; 100: fuel cell stack; 102: electricity generation unit; 103: heat exchange member; 104: end plate; 106: end plate; 108: communication hole; 110: single cell; 112: electrolyte layer; 114: cathode; 116: anode; 120: separator; 121: hole; 124: bonding member; 130: cathode-side frame; 131: hole; 132: oxidizer gas supply communication hole; 133: oxidizer gas discharge communication hole; 134: cathode-side current collector; 137: contact portion; 138: second contact portion; 140: anode-side frame; 141: hole; 142: fuel gas supply communication hole; 143: fuel gas discharge communication hole; 144: anode-side current collector; 145: electrode facing portion; 146: interconnector facing portion; 147: connection portion; 149: spacer; 150: interconnector; 152: thin plate portion; 161: oxidizer gas introduction manifold; 162: oxidizer gas discharge manifold; 163: oxidizer gas supply manifold; 166: cathode chamber; 171: fuel gas introduction manifold; 172: fuel gas discharge manifold; 176: anode chamber; 182: hole; 184: communication hole; 186: communication hole; 188: heat change flow channel; 410: first weld portion; 420: second weld portion; 510: thin plate portion; 520: thick plate portion

The invention claimed is:

1. A fuel cell electricity generation unit comprising:
   a single cell including an electrolyte layer, and a cathode and an anode which face each other in a first direction with the electrolyte layer intervening therebetween;
   first and second metal interconnectors which face each other in the first direction with the single cell intervening therebetween;
   a metal separator having a through hole and a portion which surrounds the through hole and is bonded to a peripheral portion of the single cell, thereby separating a cathode chamber facing the cathode from an anode chamber facing the anode;
   a metal frame member disposed between the separator and the first interconnector and having a through hole forming a first chamber, which is one of the anode chamber and the cathode chamber; and
   a gas sealing member disposed between the separator and the second interconnector and having a contact portion which is in contact with both the surface of the separator on the side toward the second interconnector and the surface of the second interconnector on the side toward the separator, thereby sealing a second chamber, which is the other of the anode chamber and the cathode chamber,
   the fuel cell electricity generation unit being characterized in that:
   the fuel cell electricity generation unit has a contact overlap region overlapping with the contact portion in the first direction; each of the gas sealing member, the separator, the frame member, the first interconnector, and the second interconnector is present in the contact overlap region; and
   at least one of a first weld portion sealing between the separator and the frame member and a second weld portion sealing between the frame member and the first interconnector is formed at a position whose distance from the periphery of the single cell in a second direction perpendicular to the first direction is greater than the distance between the periphery and the contact overlap region corresponding to the contact portion nearest to the single cell.

2. A fuel cell electricity generation unit according to claim 1, wherein the fuel cell electricity generation unit has a weld overlap region overlapping with at least one of the first weld portion and the second weld portion in the first direction, and the weld overlap region has a space formed such that the space overlaps with the gas sealing member in the second direction.

3. A fuel cell electricity generation unit according to claim 1, wherein the fuel cell electricity generation unit has a weld overlap region overlapping with at least one of the first weld portion and the second weld portion in the first direction, and the weld overlap region has a space formed such that the space overlaps with at least one of the first interconnector and the second interconnector in the second direction.

4. A fuel cell electricity generation unit according to claim 1, wherein the gas sealing member has a second contact portion at a position whose distance from the periphery of the single cell in the second direction is greater than the distance between the periphery and the first weld portion or the second weld portion, the second contact portion being in contact with both the surface of the separator on the side toward the second interconnector and the surface of the second interconnector on the side toward the separator, thereby sealing between the separator and the second interconnector.

5. A fuel cell electricity generation unit according to claim 1, wherein the gas sealing member overlaps with a space between the frame member and the single cell in the first direction.

6. A fuel cell stack comprising a plurality of fuel cell electricity generation units, the fuel cell stack being characterized in that:
   at least one of the fuel cell electricity generation units is a fuel cell electricity generation unit as recited in claim 1.

7. A fuel cell stack comprising a plurality of fuel cell electricity generation units arranged in a first direction; and first and second metal end plates which face each other in the first direction with the fuel cell electricity generation units intervening there between, wherein each fuel cell electricity generation unit comprises:
   a single cell including an electrolyte layer, and a cathode and an anode which face each other in the first direction with the electrolyte layer intervening there between;
   first and second metal interconnectors which face the single cell in the first direction;
   a metal separator having a through hole and a portion which surrounds the through hole and is bonded to a peripheral portion of the single cell, thereby separating a cathode chamber facing the cathode from an anode chamber facing the anode;
   a metal frame member disposed between the separator and the first interconnector facing one surface of the separator, the metal frame member having a through hole forming a first chamber, which is one of the anode chamber and the cathode chamber; and
   a gas sealing member disposed between the separator and the second interconnector facing the surface of the separator opposite the surface facing the frame member, the gas sealing member having a contact portion which is in contact with both the surface of the separator on the side toward the second interconnector and the surface of the second interconnector on the side toward the separator, thereby sealing a second chamber, which is the other of the anode chamber and the cathode chamber, wherein
   each fuel cell electricity generation unit has a contact overlap region overlapping with the contact portion in the first direction, the contact overlap region being a portion of the fuel cell stack; each of the gas sealing member, the separator, the frame member, the first interconnector, and the second interconnector of the fuel cell electricity generation unit and the first and second end plates is present in the contact overlap region; and at least one of a first weld portion sealing between the separator and the frame member and a second weld portion sealing between the frame member and the first interconnector is formed at a position whose distance from the periphery of the single cell in a second direction perpendicular to the first direction is greater than the distance between the periphery and the contact overlap region corresponding to the contact portion nearest to the single cell.

\* \* \* \* \*